US012544886B2

(12) United States Patent
Kawai

(10) Patent No.: US 12,544,886 B2
(45) Date of Patent: Feb. 10, 2026

(54) IMPACT TOOL

(71) Applicant: MAKITA CORPORATION, Anjo (JP)

(72) Inventor: Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/903,036

(22) Filed: Oct. 1, 2024

(65) Prior Publication Data

US 2025/0114922 A1 Apr. 10, 2025

(30) Foreign Application Priority Data

Oct. 4, 2023 (JP) ................................ 2023-172661

(51) Int. Cl.
*B25B 21/02* (2006.01)

(52) U.S. Cl.
CPC .................................. *B25B 21/026* (2013.01)

(58) Field of Classification Search
CPC ...... B25B 21/02; B25B 21/026; B25D 11/104
See application file for complete search history.

(56) References Cited

U.S. PATENT DOCUMENTS 2,439,823 A * 4/1948 Porter .................. B25B 21/026 173/93.5
5,836,403 A * 11/1998 Putney .................... B25B 21/02 173/205
6,158,526 A * 12/2000 Ghode .................. B25B 21/026 173/109
6,733,414 B2 * 5/2004 Elger ...................... B25B 21/02 173/205
7,971,654 B2 * 7/2011 Takeyama ............ B25B 21/026 173/90
9,381,626 B2 * 7/2016 Profunser ............... B25B 21/02
9,505,107 B2 * 11/2016 Putney .................. B25B 21/026
9,827,660 B2 * 11/2017 Blum ................... B25D 11/104
10,239,193 B2 * 3/2019 Herr ...................... B25B 21/023
10,654,153 B2 * 5/2020 Murakami .............. B25B 21/02
2001/0010268 A1 * 8/2001 Tokunaga ............... B25B 21/02 173/205

(Continued)

FOREIGN PATENT DOCUMENTS

JP 4600562 B2 12/2010
JP 2021037561 A 3/2021

OTHER PUBLICATIONS

Unpublished U.S. Appl. No. 18/903,033, first named inventor: Shinichi Urano, filed Oct. 1, 2024.

(Continued)

*Primary Examiner* — Anna K Kinsaul
*Assistant Examiner* — David G Shutty
(74) *Attorney, Agent, or Firm* — J-TEK LAW PLLC; Jeffrey D. Tekanic; Scott T. Wakeman

(57) ABSTRACT

An impact tool (1) includes: a motor (6); a spindle (8) rotated by the motor; a spindle groove (8D) formed in the spindle; a ball (48) held in the spindle groove; a hammer (47) supported on the spindle via the ball; a spring (49, 50), which biases the hammer forward; and an anvil (10) configured to be impacted by the hammer in a rotational direction. The depth of the spindle groove (8D) differs in accordance with the location thereof in an axial direction of the spindle.

20 Claims, 22 Drawing Sheets

(56) References Cited

U.S. PATENT DOCUMENTS

| | | | | |
|---|---|---|---|---|
| 2008/0073094 | A1* | 3/2008 | Lu | B25B 21/026 173/104 |
| 2010/0078186 | A1 | 4/2010 | Takeyama et al. | |
| 2018/0029206 | A1* | 2/2018 | Teh | B25D 11/04 |
| 2021/0039230 | A1* | 2/2021 | Ikuta | B25F 5/001 |
| 2021/0060755 | A1* | 3/2021 | Kawai | B25F 5/00 |
| 2022/0288700 | A1* | 9/2022 | Ono | B23B 47/26 |
| 2023/0234193 | A1* | 7/2023 | Xu | B25B 21/02 173/93 |
| 2025/0042008 | A1* | 2/2025 | Wadeson | B25B 21/026 |
| 2025/0058435 | A1* | 2/2025 | Britz | B25B 21/02 |

OTHER PUBLICATIONS

Unpublished U.S. Appl. No. 18/903,042, first named inventor: Yasuhito Kawai, filed Oct. 1, 2024.

* cited by examiner

FIG.17 [HAMMER-RELEASE TIME / IMPACT-START TIME]

[MAXIMUM-STROKE TIME]

[IMPACT TIME]

IMPACT TOOL

CROSS-REFERENCE TO RELATED APPLICATION

This application claims priority to Japanese patent application no. 2023-172661 filed on Oct. 4, 2023, the contents of which are fully incorporated herein by reference.

TECHNICAL FIELD

The techniques disclosed in the present specification relate to an impact tool.

BACKGROUND ART

An impact rotary tool related to the present teachings is disclosed in U.S. Pat. No. 7,971,654.

SUMMARY OF THE INVENTION

To improve work efficiency when employing an impact tool, there is demand for techniques that can increase the impact force of the impact tool and thereby increase the fastening speed of a screw.

It is one non-limiting object of the present teachings to disclose techniques for increasing the impact force of an impact tool.

In one non-limiting aspect of the present teachings, an impact tool may preferably comprise: a motor; a spindle rotated by the motor; a spindle groove formed in the spindle; a ball held in the spindle groove; a hammer supported on the spindle via the ball; a spring, which biases the hammer forward; and an anvil, which is impacted by the hammer in a rotational direction. The depth of the spindle groove differs in accordance with the location thereof in an axial direction of the spindle.

By utilizing the techniques disclosed in the present specification, the impact force of an impact tool is increased.

DETAILED DESCRIPTION

Figure 1:
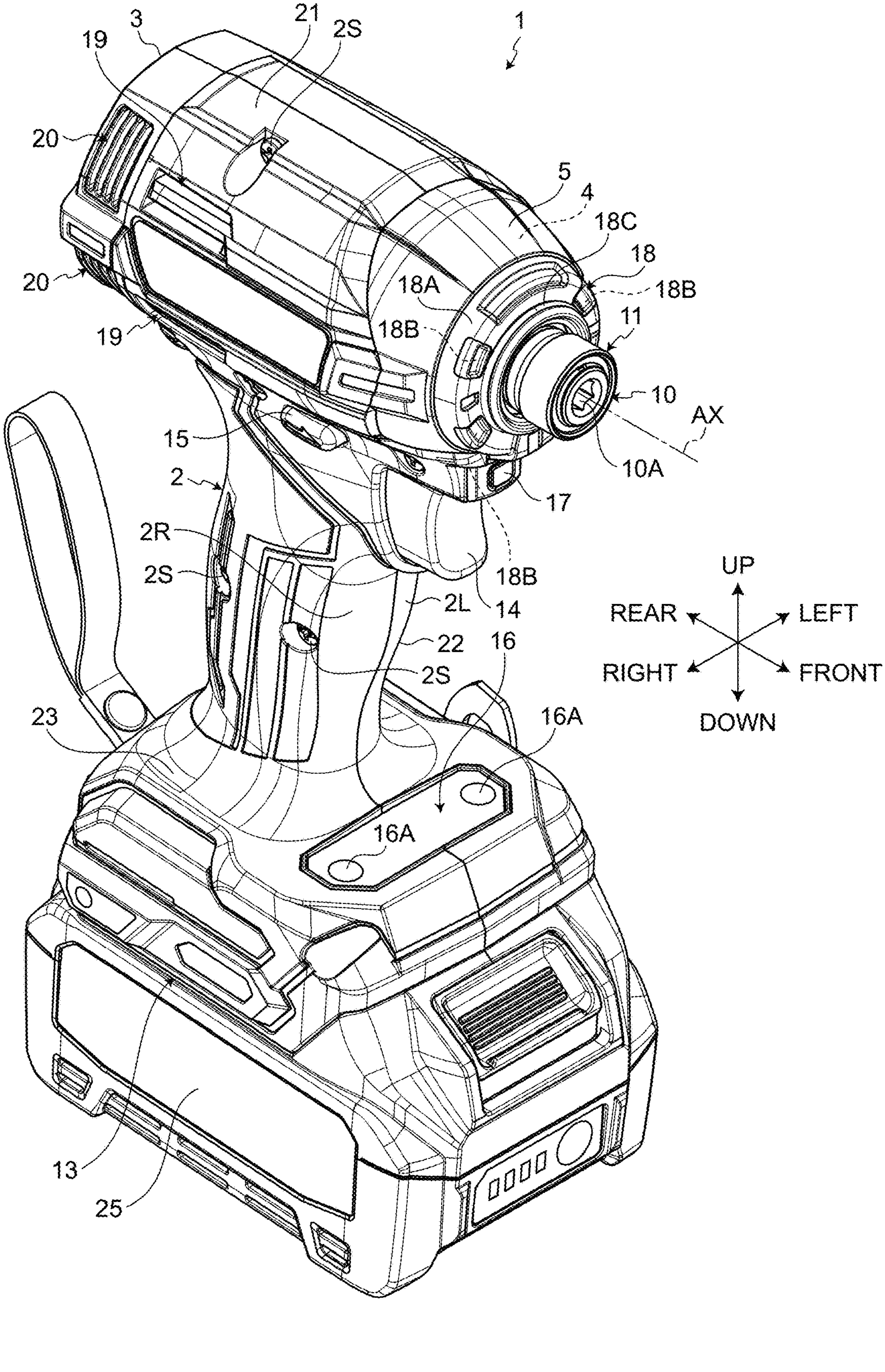
FIG. 1 is an oblique view, viewed from the front, that shows an impact tool according to an embodiment of the present teaching.

As was mentioned above, an impact tool according to one aspect of the present teachings preferably comprises: a motor; a spindle rotated by the motor; a spindle groove formed in the spindle; a ball held in the spindle groove; a hammer supported on the spindle via the ball; a spring, which biases the hammer forward; and an anvil, which is impacted by the hammer in a rotational direction. The depth of the spindle groove differs in accordance with the location thereof in an axial direction of the spindle. In other words, the depth of the spindle groove varies along the circumferential direction of the spindle groove.

During screw-tightening work, when a load torque from the screw greater than or equal to a prescribed value acts on the anvil, the rotation of the anvil and the hammer momentarily stops. Because the spindle continues to rotate owing to the motor, the spindle continues to rotate in the state in which the rotation of the hammer is momentarily stopped. As a result, the hammer moves rearward relative to the spindle. After the hammer has moved rearward, the hammer moves forward while rotating owing to the biasing force of the spring. The anvil is impacted by the hammer in the rotational direction owing to the hammer moving forward while rotating. In the above-mentioned configuration, the depth of the spindle groove differs in accordance with the location thereof in the axial direction; therefore, among the forces acting between the spindle and the ball, the component in the rotational direction becomes larger (than an embodiment in which the depth of the spindle groove does not vary along the length thereof). Consequently, the rotational speed of the hammer—when the hammer is moving forward while rotating—can be increased. Because the rotational speed of the hammer can be increased, the hammer can impact the anvil with a larger impact force.

Furthermore, because the component in the rotational direction becomes larger, the force component in the axial direction becomes smaller (than an embodiment in which the depth of the spindle groove does not vary along the length thereof); therefore, even if the spring were to have a smaller spring coefficient, the spring can still bias the hammer forward. That is, even if the spring were to have a small biasing force, the hammer can move forward while rotating owing to the biasing force of the spring. By using a spring having a smaller biasing force, the timing of the start of impact of the hammer on the anvil becomes earlier (than in an embodiment in which the biasing force of the spring is greater). Consequently, the interval from the point in time when the rotation of the hammer has stopped until the point in time when the anvil is impacted by the hammer becomes shorter (than in an embodiment in which the biasing force of the spring is greater).

During the screw-tightening work, the anvil is rotated while the tool accessory (e.g., a screwdriving bit) mounted in the anvil is inserted in a cruciform groove formed in a head portion of the screw (e.g., a Phillips-head screw). In an embodiment in which the timing of the start of impact of the hammer on the anvil is later (that is, if the amount of screw rotation from the screw-tightening start time until the impact time when the anvil is impacted by the hammer is larger), then the probability of the occurrence of the cam-out phenomenon, in which the tool accessory comes completely out of the cross groove while attempting to fasten the screw, is relatively high. However, in the above-mentioned configuration, because the timing of the start of impact of the hammer on the anvil is earlier, the occurrence of the cam-out phenomenon can be reduced.

In one or more embodiments, an end portion of the spindle groove is disposed more rearward than a center portion of the spindle groove. When the hammer moves rearward relative to the spindle, the ball moves to the end portion of the spindle groove. The depth at the end portion of the spindle groove is deeper than any point between the center portion and the end portion of the spindle groove.

Thus, when the hammer moves rearward relative to the spindle, the ball moves from the center portion to the end portion of the spindle groove. Thereafter, the hammer moves forward relative to the spindle owing to the biasing force of the spring, whereby the ball moves from the end portion back to the center portion of the spindle groove. In the above-mentioned configuration, because the center of the ball sinks into the inside of the spindle groove at the end portion of the spindle groove (i.e. the center of the ball is closer to the center of the spindle than the circumferential surface of the spindle), the rotational speed of the hammer—when the hammer is moving forward while rotating—can be increased. Because the rotational speed of the hammer can be increased, the hammer can impact the anvil with a larger impact force.

In one or more embodiments, the center of the ball is disposed outside of the spindle groove at the center portion of the spindle groove (i.e. the center of the ball is farther from the center of the spindle than the outer circumferential surface of the spindle).

As was noted above, when the hammer impacts the anvil, the ball moves from the end portion back to the center portion of the spindle groove. In the above-mentioned configuration, because the center of the ball that is at the center portion of the spindle groove is disposed outside of the spindle groove, the rotational speed of the hammer—at the moment the hammer impacts the anvil—can be increased. Because the rotational speed of the hammer can be increased, the hammer can impact the anvil with a larger impact force.

In one or more embodiments, the spindle comprises a flange portion, which supports (contacts) a rear-end portion of the spring, and a spindle-shaft portion, which protrudes forward from the flange portion. The spindle groove is formed in the spindle-shaft portion. The trajectory of the center of the ball enters within the width of the spindle-shaft portion.

In the above-mentioned configuration, because the ball has a small range of motion, the size of the impact tool need not be enlarged even though the rotational speed of the hammer has been increased.

In one or more embodiments, the trajectory of the ball has an arcuate shape.

In the above-mentioned configuration, the ball moves with circular motion along a virtual circle having a small radius. Consequently, the hammer can move in the axial direction while rotating smoothly. Because the sliding resistance of the hammer becomes smaller, the rotational speed of the hammer can be increased. Consequently, the hammer can impact the anvil with a larger impact force.

In one or more embodiments, the ball may move with circular motion within a virtual plane that is tilted by a prescribed angle from the rotational axis of the spindle.

In the above-mentioned configuration, because the sliding resistance of the hammer is decreased, the rotational speed of the hammer can be increased. Consequently, the hammer can impact the anvil with a larger impact force.

In one or more embodiments, the ball moves with circular motion so that the center of the ball moves along a virtual circle defined in the virtual plane. The center of the virtual circle is defined at a location that is offset from the rotational axis of the spindle.

In the above-mentioned configuration, the hammer can impact the anvil with a larger impact force.

In one or more embodiments, the spindle comprises the flange portion, which supports (contacts) the rear-end portion of the spring, and the spindle-shaft portion, which protrudes forward from the flange portion. The spindle groove is formed in the spindle-shaft portion. The diameter of the virtual circle is smaller than the diameter of the spindle-shaft portion.

In the above-mentioned configuration, because the ball has a small range of motion, the size of the impact tool need not be enlarged even though the rotational speed of the hammer has been increased.

An exemplary embodiment of the present teachings is explained below, with reference to the drawings. In the embodiment, positional relationships among the parts are explained using the terms left, right, front, rear, up, and down. These terms indicate relative position or direction, wherein the center of an impact tool 1 is the reference. The impact tool 1 comprises a motor 6, which serves as a motive power supply.

In the embodiment, the direction parallel to rotational axis AX of the motor 6 is called the axial direction where appropriate, the direction that goes around rotational axis AX is called the circumferential direction or the rotational direction where appropriate, and the radial direction of rotational axis AX is called the radial direction where appropriate.

Rotational axis AX extends in a front-rear direction. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

Impact Tool

Figure 2:
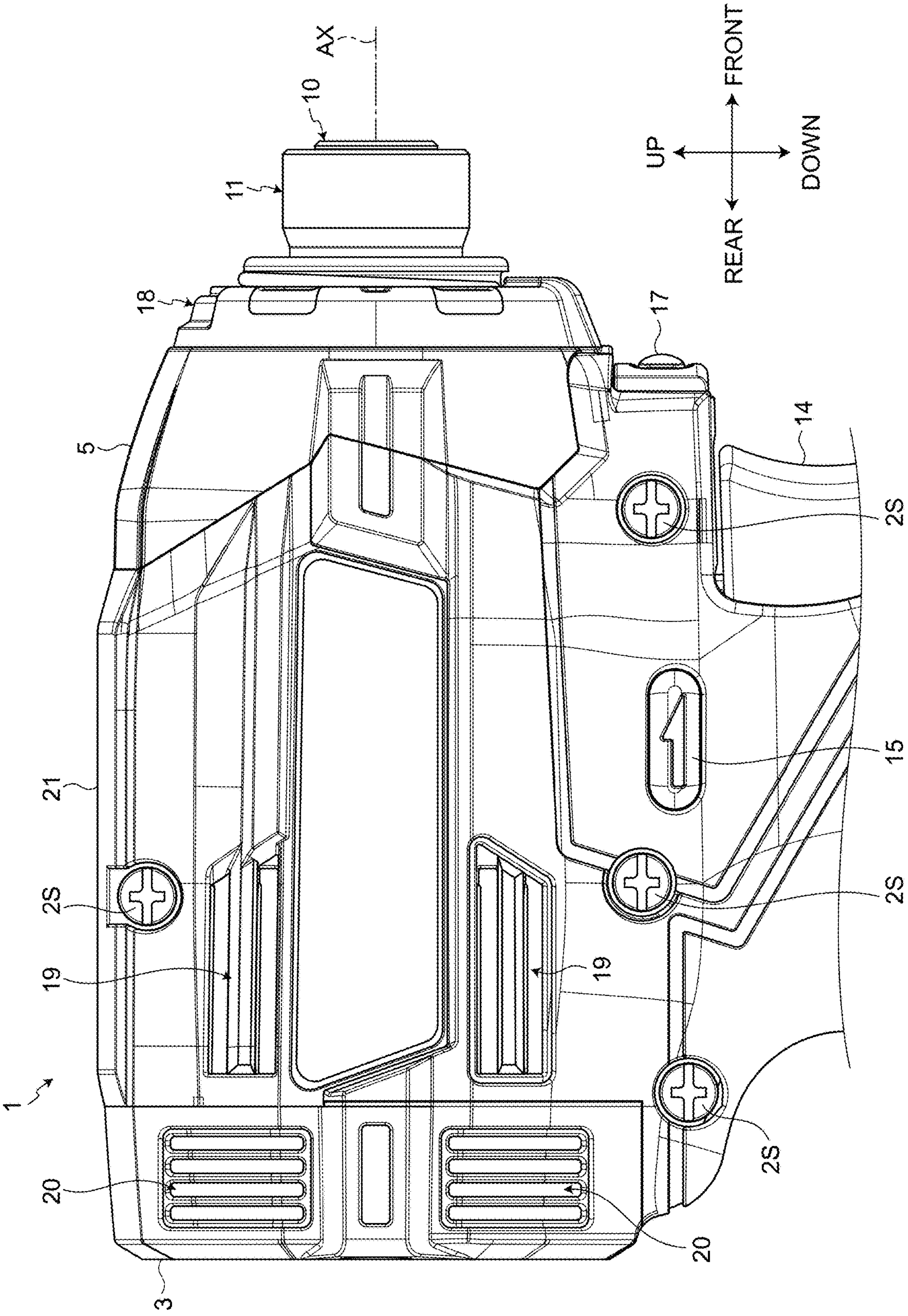
FIG. 2 is a side view that shows an upper portion of the impact tool according to the embodiment.
Figure 3:
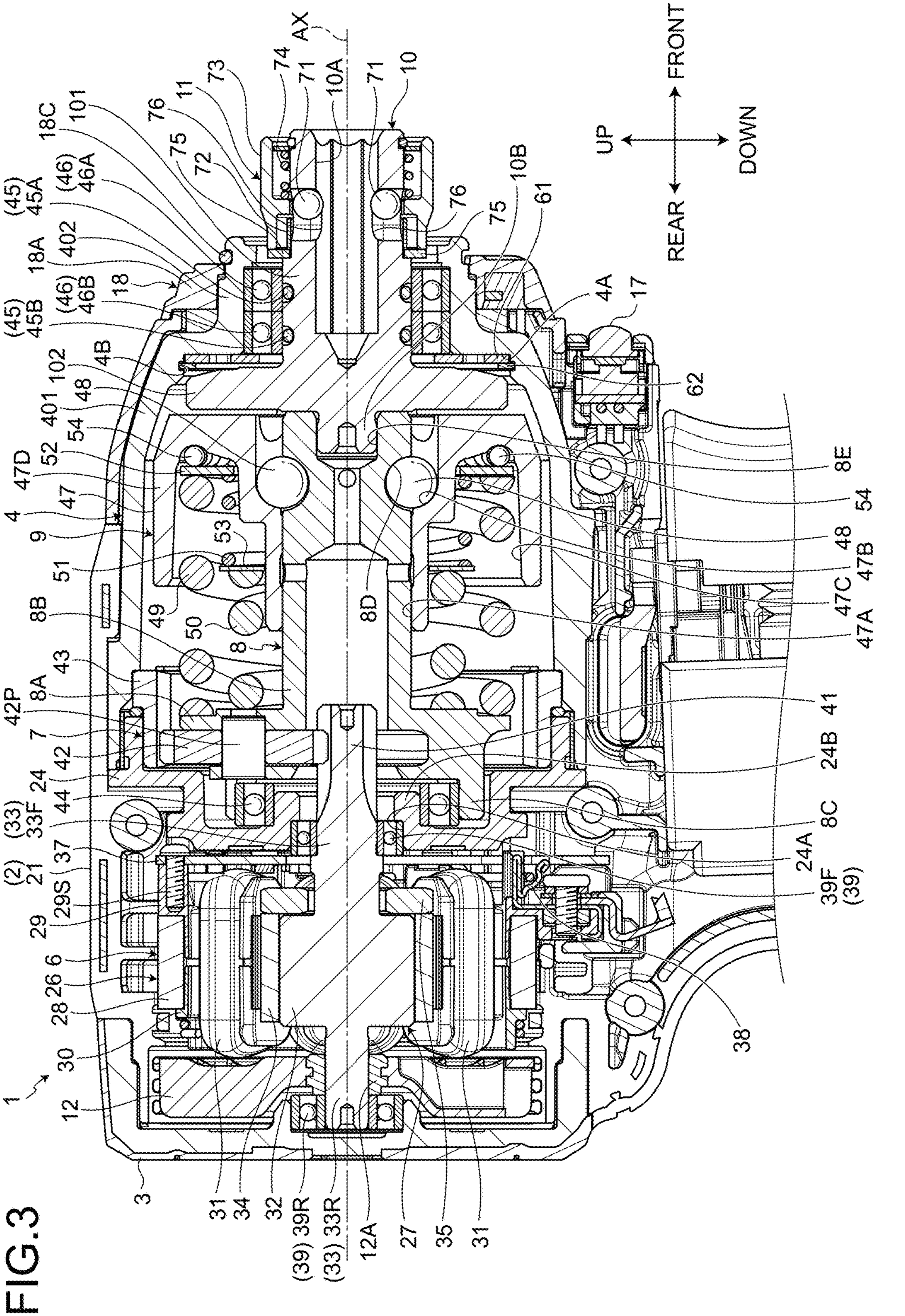
FIG. 3 is a longitudinal, cross-sectional view that shows the upper portion of the impact tool according to the embodiment.
Figure 4:
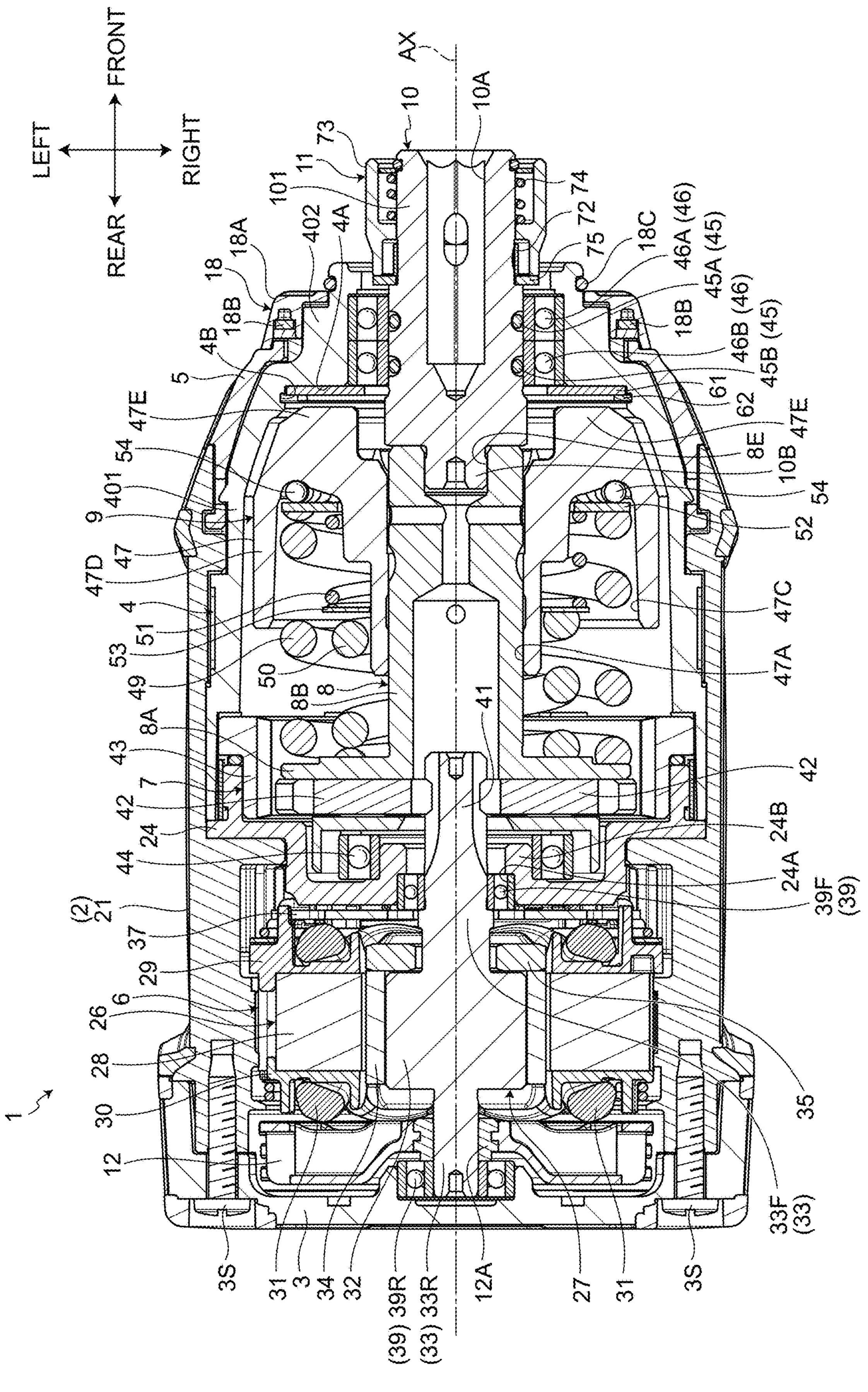
FIG. 4 is a transverse, cross-sectional view that shows the upper portion of the impact tool according to the embodiment.

FIG. 1 is an oblique view, viewed from the front, that shows the impact tool 1 according to the embodiment. FIG. 2 is a side view that shows an upper portion of the impact tool 1 according to the embodiment. FIG. 3 is a longitudinal, cross-sectional view that shows the upper portion of the impact tool 1 according to the embodiment. FIG. 4 is a transverse, cross-sectional view that shows the upper portion of the impact tool 1 according to the embodiment.

In the embodiment, the impact tool 1 is an impact driver, which is one type of screw-tightening tool according to the present teachings. The impact tool 1 comprises a housing 2, a rear cover 3, a hammer case 4, a hammer-case cover 5, the motor 6, a speed-reducing mechanism 7, a spindle 8, an impact mechanism 9, an anvil 10, a tool-holding mechanism 11, a fan 12, a battery-mounting part 13, a trigger lever 14, a forward/reverse-change lever 15, an operation-and-display part 16, a mode-change switch (quick mode-switching button) 17, and a light assembly 18.

The housing 2 is made of a synthetic resin (polymer). In the embodiment, the housing 2 is made of nylon (polyamide). The housing 2 comprises a left housing 2L and a right housing 2R, which is disposed rightward of the left housing 2L. The left housing 2L and the right housing 2R are fixed to each other by a plurality of screws 2S. Thus, the housing 2 is constituted from a pair of half housings.

The housing 2 comprises a motor-housing part 21, a grip part 22, and a battery-holding part 23.

The motor-housing part 21 has a tube shape. The motor-housing part 21 houses the motor 6. The motor-housing part 21 houses at least a portion of the hammer case 4.

The grip part 22 extends downward from the motor-housing part 21. The trigger lever 14 is provided at an upper portion of the grip part 22. The grip part 22 is gripped by the user.

The battery-holding part 23 is connected to a lower-end portion of the grip part 22. In both the front-rear direction and the left-right direction, the dimensions of the outer shape of the battery-holding part 23 are larger than the dimensions of the outer shape of the grip part 22.

The rear cover 3 is made of a synthetic resin (polymer), such as nylon. The rear cover 3 is disposed rearward of the motor-housing part 21. The rear cover 3 houses at least a portion of the fan 12. The fan 12 is disposed on the inner-circumference side of the rear cover 3. The rear cover 3 is disposed so as to cover an opening of a rear-end portion of the motor-housing part 21. The rear cover 3 is fixed to the rear-end portion of the motor-housing part 21 by two screws 3S.

The motor-housing part 21 has air-intake ports 19. The rear cover 3 has air-exhaust ports 20. Air outside of the housing 2 flows into the interior space of the housing 2 via the air-intake ports 19. Air in the interior space of the housing 2 flows out to the exterior of the housing 2 via the air-exhaust ports 20.

The hammer case 4 is made of a metal. In the embodiment, the hammer case 4 is made of aluminum. The hammer case 4 has a tube shape. The hammer case 4 is connected to a front portion of the motor-housing part 21. A bearing box 24 is fixed to a rear portion of the hammer case 4. A screw thread is formed on an outer circumferential portion of the bearing box 24. A thread groove is formed in an inner circumferential portion of the hammer case 4. The bearing box 24 and the hammer case 4 are fixed to each other by the coupling of the screw thread of the bearing box 24 and the thread groove of the hammer case 4 to each other. The hammer case 4 is sandwiched between the left housing 2L and the right housing 2R. At least a portion of the hammer case 4 is housed in the motor-housing part 21. The bearing box 24 is fixed to both the motor-housing part 21 and the hammer case 4.

The hammer case 4 houses the speed-reducing mechanism 7, the spindle 8, the impact mechanism 9, and at least a portion of the anvil 10. At least a portion of the speed-reducing mechanism 7 is disposed in the interior of the bearing box 24. The speed-reducing mechanism 7 comprises a plurality of gears.

The hammer case 4 has a first tube portion 401 and a second tube portion 402. The first tube portion 401 is disposed around the impact mechanism 9. The second tube portion 402 is disposed more forward than the first tube portion 401. The outer diameter of the second tube portion 402 is smaller than the outer diameter of the first tube portion 401.

The hammer-case cover 5 covers at least a portion of the surface of the hammer case 4. The hammer-case cover 5 protects the hammer case 4. The hammer-case cover 5 blocks contact between the hammer case 4 and objects around the hammer case 4.

The motor 6 is the motive power source of the impact tool 1. The motor 6 is an inner-rotor-type brushless motor. The motor 6 comprises a stator 26 and a rotor 27. The stator 26 is supported by the motor-housing part 21. At least a portion of the rotor 27 is disposed in the interior of the stator 26. The rotor 27 rotates relative to the stator 26. The rotor 27 rotates about rotational axis AX, which extends in the front-rear direction.

The stator 26 comprises a stator core 28, a front insulator 29, a rear insulator 30, and coils 31.

The stator core 28 is disposed more radially outward than the rotor 27. The stator core 28 comprises (is composed of) a plurality of laminated steel sheets. Each of the steel sheets is a sheet made of a metal in which iron is the main component. The stator core 28 has a tube shape. The stator core 28 comprises teeth that respectively support the coils 31.

The front insulator 29 is provided at a front portion of the stator core 28. The rear insulator 30 is provided at a rear portion of the stator core 28. The front insulator 29 and the rear insulator 30 are each an electrically insulating member that is made of a synthetic resin (polymer). The front insulator 29 is disposed so as to cover a forward portion of the surface of each of the teeth. The rear insulator 30 is disposed so as to cover a rearward portion of the surface of each of the teeth.

The coils 31 are mounted (wound) on the stator core 28 via (over) the front insulator 29 and the rear insulator 30. A plurality of the coils 31 is provided. The coils 31 are respectively disposed around the teeth of the stator core 28 via (over) the front insulator 29 and the rear insulator 30. The coils 31 and the stator core 28 are electrically insulated from each other by the front insulator 29 and the rear insulator 30. The coils 31 are electrically connected to a source of power (e.g., the battery pack) via fusing terminals 38.

The rotor 27 rotates about rotational axis AX. The rotor 27 has a rotor-core portion 32, a rotor-shaft portion 33, at least one rotor magnet 34, and at least one sensor magnet 35.

The rotor-core portion 32 and the rotor-shaft portion 33 are each made of steel. The rotor-shaft portion 33 protrudes in the front-rear direction from end surfaces of the rotor-core portion 32. The rotor-shaft portion 33 includes a front-side shaft portion 33F, which protrudes forward from a front-end surface of the rotor-core portion 32, and a rear-side shaft portion 33R, which protrudes rearward from a rear-end surface of the rotor-core portion 32.

The rotor magnet 34 is fixed to the rotor-core portion 32. The rotor magnet 34 has a circular-tube shape. The rotor magnet 34 is disposed around the rotor-core portion 32.

The sensor magnet 35 is fixed to the rotor-core portion 32. The sensor magnet 35 has a circular-ring shape. The sensor magnet 35 is disposed at the front-end surface of the rotor-core portion 32 and a front-end surface of the rotor magnet 34.

A sensor board 37 is mounted on the front insulator 29. The sensor board 37 is fixed to the front insulator 29 by a screw 29S. The sensor board 37 comprises a disk-shaped circuit board, in which a through hole is provided at the center, and at least one rotation-detection device, which is supported on the circuit board. At least a portion of the sensor board 37 opposes the sensor magnet 35. The rotation-detection device detects the location of the rotor 27 in the rotational direction by detecting the location of the sensor magnet 35 of the rotor 27.

The rotor-shaft portion 33 is supported by rotor bearings 39 in a rotatable manner. The rotor bearings 39 include a front-side rotor bearing 39F, which supports the front-side shaft portion 33F in a rotatable manner, and a rear-side rotor bearing 39R, which supports the rear-side shaft portion 33R in a rotatable manner.

The front-side rotor bearing 39F is held by the bearing box 24. The bearing box 24 has a recessed portion 24A, which is recessed forward from a rear surface of the bearing box 24. The front-side rotor bearing 39F is disposed in the recessed portion 24A. The rear-side rotor bearing 39R is held by the rear cover 3. A front-end portion of the front-side rotor-shaft portion 33F is disposed in the interior space of the hammer case 4 via an opening in the bearing box 24.

A pinion gear 41 is formed at a front-end portion of the rotor-shaft portion 33. The pinion gear 41 is coupled to an input portion of the speed-reducing mechanism 7. More specifically, the rotor-shaft portion 33 is coupled to the speed-reducing mechanism 7 via the pinion gear 41.

The speed-reducing mechanism 7 is disposed more forward than the motor 6. The speed-reducing mechanism 7 couples the rotor-shaft portion 33 and the spindle 8 to each other. The speed-reducing mechanism 7 transmits the rotation of the rotor 27 to the spindle 8. The speed-reducing mechanism 7 causes the spindle 8 to rotate at a rotational speed that is lower than the rotational speed of the rotor-shaft portion 33, but at an increased torque. The speed-reducing mechanism 7 comprises a planetary-gear mechanism.

The planetary-gear mechanism of the speed-reducing mechanism 7 comprises a plurality of gears. The gears of the speed-reducing mechanism 7 are driven by the rotor 27.

More specifically, the speed-reducing mechanism 7 comprises a plurality of planet gears 42, which is disposed around the pinion gear 41, and an internal gear 43, which is disposed around the plurality of planet gears 42. The pinion gear 41, the planet gears 42, and the internal gear 43 are each housed in the hammer case 4. Each of the planet gears 42 meshes with the pinion gear 41. The planet gears 42 are respectively supported in a rotatable manner by the spindle 8 via pins 42P. The spindle 8 is rotated by the planet gears 42. The internal gear 43 has inner teeth, which mesh with the planet gears 42. The internal gear 43 is fixed to the hammer case 4. The internal gear 43 is always non-rotatable relative to the hammer case 4.

When the rotor-shaft portion 33 rotates owing to the drive of the motor 6, the pinion gear 41 rotates, and the planet gears 42 revolve around the pinion gear 41. The planet gears 42 revolve while meshing with the inner teeth of the internal gear 43. Owing to the revolving of the planet gears 42, the spindle 8, which is connected to the planet gears 42 via the pins 42P, rotates at a rotational speed that is lower than the rotational speed of the rotor-shaft portion 33.

The spindle 8 is disposed more forward than at least a portion of the motor 6. The spindle 8 is disposed more forward than the stator 26. At least a portion of the spindle 8 is disposed more forward than the rotor 27. At least a portion of the spindle 8 is disposed forward of the speed-reducing mechanism 7. The spindle 8 is disposed rearward of the anvil 10. The spindle 8 is rotated by the rotor 27. The spindle 8 rotates owing to the rotational force of the rotor 27 transmitted thereto by the speed-reducing mechanism 7. The spindle 8 transmits the rotational force of the motor 6 to the anvil 10 via balls 48 and a hammer 47.

The spindle 8 comprises a flange portion 8A and a spindle-shaft portion 8B, which protrudes forward from the flange portion 8A. The planet gears 42 are supported on the flange portion 8A in a rotatable manner via the pins 42P. The rotational axis of the spindle 8 and rotational axis AX of the motor 6 coincide (are colinear) with each other. The spindle 8 rotates about rotational axis AX. The spindle 8 is supported by a spindle bearing 44 in a rotatable manner. Protruding portions 8C are provided on a rear side of the spindle 8. The protruding portions 8C protrude rearward from the flange portion 8A. The protruding portions 8C are disposed so as to surround the spindle bearing 44.

The bearing box 24 is disposed at least partly around the spindle 8. The spindle bearing 44 is held in the bearing box 24. The bearing box 24 has a protruding portion 24B, which protrudes forward from a front surface of the bearing box 24. The spindle bearing 44 is disposed around the protruding portion 24B.

The impact mechanism 9 is driven by the motor 6. The rotational force of the motor 6 is transmitted to the impact mechanism 9 via the speed-reducing mechanism 7 and the spindle 8. The impact mechanism 9 impacts the anvil 10 in the rotational direction using the rotational force of the spindle 8, which is rotated by the motor 6. The impact mechanism 9 comprises the hammer 47, the balls 48, a first coil spring 49, a second coil spring 50, a third coil spring 51, a first washer 52, and a second washer 53. The impact mechanism 9, which comprises the hammer 47, the balls 48, the first coil spring 49, the second coil spring 50, the third coil spring 51, the first washer 52, and the second washer 53, is housed in the first tube portion 401 of the hammer case 4.

The hammer 47 is disposed more forward than the speed-reducing mechanism 7. The hammer 47 is disposed around the spindle 8. The hammer 47 is held by the spindle 8. The balls 48 are disposed between the spindle 8 and the hammer 47. The hammer 47 comprises a tube-shaped hammer body 47D and hammer-projection portions 47E, which are provided at front portions of the hammer body 47D. A ring-shaped recessed portion 47C is provided in a rear surface of the hammer body 47D. The recessed portion 47C is recessed forward from the rear surface of the hammer body 47D.

The hammer 47 is disposed around the spindle-shaft portion 8B. The hammer 47 has a through hole 47A in which the spindle-shaft portion 8B is disposed.

The hammer 47 is rotated using the rotational energy output by the motor 6 as will be further explained below. The rotational force of the motor 6 is transmitted to the hammer 47 via the speed-reducing mechanism 7 and the spindle 8. The hammer 47 is rotatable, together with the spindle 8, using the rotational force of the spindle 8, which is rotated by the motor 6. The rotational axis of the hammer 47, the rotational axis of the spindle 8, and rotational axis AX of the motor 6 coincide with each other. The hammer 47 rotates about rotational axis AX.

The first washer 52 is disposed inside the recessed portion 47C. The first washer 52 is supported by the hammer 47 via a plurality of balls 54. The balls 54 are disposed more forward than the first washer 52.

The second washer 53 is disposed inside the recessed portion 47C more rearward than the first washer 52. The outer diameter of the second washer 53 is smaller than the outer diameter of the first washer 52. The second washer 53 and the hammer 47 can move relative to each other in the front-rear direction.

The first coil spring 49 is disposed around the spindle-shaft portion 8B. A rear-end portion of the first coil spring 49 is supported by (contacts) the flange portion 8A. A front-end portion of the first coil spring 49 is disposed inside the recessed portion 47C and is supported by (contacts) the first washer 52. The first coil spring 49 continuously generates a biasing force (elastic force) that urges the hammer 47 to move forward.

The second coil spring 50 is disposed around the spindle-shaft portion 8B. The second coil spring 50 is disposed radially inward of the first coil spring 49. A rear-end portion of the second coil spring 50 is supported by (contacts) the flange portion 8A. A front-end portion of the second coil spring 50 is disposed inside the recessed portion 47C and is supported by (contacts) the second washer 53. The second coil spring 50 generates a biasing force (elastic force) that urges the hammer 47 to move forward, in particular, when the hammer 47 has moved rearward.

The third coil spring 51 is disposed around the spindle-shaft portion 8B. The third coil spring 51 is disposed radially inward of the first coil spring 49. The third coil spring 51 is disposed inside the recessed portion 47C. A rear-end portion of the third coil spring 51 is supported by (contacts) the second washer 53. A front-end portion of the third coil spring 51 is supported by (contacts) the first washer 52. The third coil spring 51 generates a biasing force (elastic force) that urges the second coil spring 50 to move rearward. Owing to the biasing force of the third coil spring 51, the rear-end portion of the second coil spring 50 is pushed against the flange portion 8A. Thereby, the second coil spring 50 is restricted from moving freely relative to the flange portion 8A.

The balls 48 are made of a metal such as steel. The balls 48 are disposed between the spindle-shaft portion 8B and the hammer 47. The spindle 8 has spindle grooves 8D, in each of which at least a portion of the corresponding ball 48 is disposed. The spindle grooves 8D are provided in portions of an outer circumferential surface 8S of the spindle-shaft portion 8B. The hammer 47 has hammer grooves 47B, in each of which at least a portion of the corresponding ball 48 is disposed. The hammer grooves 47B are provided in portions of an inner surface of the hammer 47. The balls 48 are disposed between the spindle grooves 8D and the hammer grooves 47B, respectively. Each of the balls 48 can roll along the inner side of the corresponding spindle groove 8D and the inner side of the corresponding hammer groove 47B, respectively. The hammer 47 is movable along with the balls 48. The spindle 8 and the hammer 47 can move relative to each other in both the axial direction and the rotational direction within a movable range defined by the spindle grooves 8D and the hammer grooves 47B.

The anvil 10 is disposed more forward than the motor 6. The anvil 10 is an output part of the impact tool 1, which rotates based on the rotational force of the rotor 27. At least a portion of the anvil 10 is disposed more forward than the hammer 47. The anvil 10 has a tool hole 10A into which a tool accessory (e.g., a screwdriver bit) is inserted. The tool hole 10A is provided at (in) a front-end portion of the anvil 10. Thus, the tool accessory is mounted on (in) the anvil 10.

The anvil 10 has an anvil-protruding portion 10B. The anvil-protruding portion 10B is provided at a rear-end portion of the anvil 10. The anvil-protruding portion 10B protrudes rearward from the rear-end portion of the anvil 10. The spindle 8 is disposed rearward of the anvil 10. A spindle recessed portion 8E is provided at a front-end portion of the spindle-shaft portion 8B. The anvil-protruding portion 10B is disposed in the spindle recessed portion 8E.

The anvil 10 comprises a rod-shaped anvil-shaft portion 101 and two anvil-projection portions 102. The tool hole 10A is provided at a front-end portion of the anvil-shaft portion 101. The tool accessory is mounted in the anvil-shaft portion 101. The anvil-projection portions 102 are provided at a rear side of the anvil 10. The anvil-projection portions 102 protrude radially outward from the anvil-shaft portion 101.

The anvil 10 is supported in a rotatable manner by bearings 46. The rotational axis of the anvil 10, the rotational axis of the hammer 47, the rotational axis of the spindle 8, and rotational axis AX of the motor 6 coincide (are colinear) with each other. The anvil 10 rotates about rotational axis AX. The bearings 46 are disposed around the anvil-shaft portion 101. The bearings 46 are disposed in the interior of the second tube portion 402 of the hammer case 4. The bearings 46 are held in the second tube portion 402 of the hammer case 4. The bearings 46 support a front portion of the anvil-shaft portion 101 in a rotatable manner.

O-rings 45 are disposed between the bearings 46 and the anvil-shaft portion 101. The O-rings 45 contact an outer circumferential portion of the anvil-shaft portion 101 and an inner circumferential portion of the bearings 46, respectively.

In the embodiment, two of the bearings 46 are disposed in the axial direction. The bearings 46 include a bearing 46A and a bearing 46B, which is disposed more rearward than the bearing 46A.

Additionally, in the embodiment, two of the O-rings 45 are disposed in the axial direction. The O-rings 45 include an O-ring 45A and an O-ring 45B, which is disposed more rearward than the O-ring 45A. The O-ring 45A is disposed between the bearing 46A and the anvil-shaft portion 101. The O-ring 45B is disposed between the bearing 46B and the anvil-shaft portion 101.

The bearings 46 are ball bearings. Each of the bearings 46 has an inner ring, balls, and an outer ring. The inner ring of the bearing 46A contacts the O-ring 45A. The inner ring of the bearing 46B contacts the O-ring 45B. The balls of the bearings 46 are disposed between the inner rings and the outer rings in the radial direction. The balls of the bearings 46 contact the inner rings and the outer rings, respectively. A plurality of the balls of the bearings 46 is disposed in the circumferential direction. The outer rings are disposed more radially outward than the inner rings and the balls. The outer ring of the bearing 46A contacts an inner circumferential surface of the second tube portion 402. The outer ring of the bearing 46B contacts an inner circumferential surface of the second tube portion 402.

At least a portion of the hammer 47 can contact the anvil-projection portions 102. The hammer-projection portions 47E are provided protruding forward from front portions of the hammer 47. The hammer-projection portions 47E and the anvil-projection portions 102 are capable of contacting each other. In the state in which the hammer 47 and the anvil-projection portions 102 are in contact with each other, the anvil 10 rotates together with the hammer 47 and the spindle 8 when the motor 6 is driven.

The anvil 10 can also be impacted in the rotational direction by the hammer 47. For example, when the load (torque) acting on the anvil 10 becomes high during screw-tightening work, the anvil 10 can no longer be caused to rotate by merely the load of the first coil spring 49. When the anvil 10 can no longer be caused to rotate by merely the load of the first coil spring 49, the rotation of the anvil 10 and the hammer 47 will momentarily stop. The spindle 8 and the hammer 47 can move relative to each other in the axial direction and the circumferential direction via the balls 48. When the rotation of the hammer 47 momentarily stops, the rotation of the spindle 8 continues owing to the motive power generated by the motor 6. Thus, when the rotation of the hammer 47 has momentarily stopped and the spindle 8 continues to rotate, the balls 48 move rearward while being guided by the spindle grooves 8D and the hammer grooves 47B. The hammer 47 receives a force from the balls 48 and moves rearward along with the balls 48. That is, while the rotation of the anvil 10 is momentarily stopped, the hammer 47 moves rearward owing to the rotation of the spindle 8. The contact between the hammer 47 and the anvil-projection portions 102 is released by the movement of the hammer 47 rearward.

As described above, the first coil spring 49 continuously generates a biasing force that urges the hammer 47 to move forward. The second coil spring 50 generates a biasing force that urges the hammer 47 to move forward after the hammer 47 has moved more rearward than a defined position. After having moved rearward, the hammer 47 moves forward owing to the biasing forces of the first coil spring 49 and the second coil spring 50. When the hammer 47 moves forward, it receives a force in the rotational direction from the balls 48. That is, the hammer 47 moves forward while rotating. When the hammer 47 moves forward while rotating, the hammer 47 contacts the anvil-projection portions 102 while rotating. Thereby, the anvil-projection portions 102 are impacted (hammered) in the rotational direction by the hammer-projection portions 47E of the hammer 47. The motive power of the motor 6 and the inertial force of the hammer 47 both act on the anvil 10. Accordingly, the anvil 10 can be rotated about rotational axis AX with a higher torque.

The tool-holding mechanism 11 is disposed around a front portion of the anvil 10. The tool-holding mechanism 11 holds the tool accessory that is inserted in the tool hole 10A of the anvil 10. The tool accessory is detachable from the tool-holding mechanism 11.

The tool-holding mechanism 11 comprises balls 71, a leaf spring (flat spring, circular spring) 72, a sleeve 73, a coil spring 74, and a positioning member 75.

The anvil 10 has support recessed portions 76, which support the balls 71. The support recessed portions 76 are formed in the outer circumferential surface of the anvil-shaft portion 101. In the embodiment, two of the support recessed portions 76 are formed in the anvil-shaft portion 101.

The balls 71 are supported by the anvil 10 in a movable manner. The balls 71 are disposed in the support recessed portions 76. One of the balls 71 is disposed in each one of the support recessed portions 76.

Through holes, which connect the inner surfaces of the support recessed portions 76 and the inner surface of the tool hole 10A, are formed in the anvil-shaft portion 101. In the state in which the balls 71 are supported by the support recessed portions 76, at least a portion of each of the balls 71 is disposed in the interior of the tool hole 10A. The balls 71 can thereby fix the tool accessory that is inserted into the tool hole 10A. The balls 71 are capable of moving to an engaged position, at which the tool accessory is fixed, and a released position, at which the fixing of the tool accessory is released.

The leaf spring 72 generates an elastic force that urges the balls 71 to move toward the engaged position. The leaf spring 72 is disposed around the anvil-shaft portion 101. The leaf spring 72 generates an elastic force that urges the balls 71 to move radially inward.

The sleeve 73 is a circular-tube-shaped member. The sleeve 73 is disposed around the anvil-shaft portion 101. The sleeve 73 is capable of moving in (along) an axial direction relative to the anvil-shaft portion 101. The sleeve 73 can prevent the balls 71, which are disposed at the engaged position, from escaping from the engaged position. By moving in the axial direction, the sleeve 73 can transition (move) the balls 71 from the engaged position to the released position, that is, to the state in which the balls 71 are movable.

The sleeve 73 is capable of moving along the circumference of the anvil-shaft portion 101 to a blocked position, at which movement of the balls 71 radially outward is blocked, and to a permitted position, at which movement of the balls 71 radially outward is permitted.

By disposing the sleeve 73 at the blocked position, radially outward movement of the balls 71 disposed at the engaged position is blocked. That is, by disposing the sleeve 73 at the blocked position, the balls 71 disposed at the engaged position are blocked from escaping from the engaged position. By disposing the sleeve 73 at the blocked position, the state in which the tool accessory is fixed by the balls 71 is maintained.

By moving the sleeve 73 to the permitted position, the balls 71 disposed at the engaged position are permitted to move radially outward. By axially moving the sleeve 73 to the permitted position, the balls 71 are transitioned from the engaged position to the released position, that is, to the state in which the balls 71 are movable. That is, by disposing the sleeve 73 at the permitted position, the balls 71 disposed at the engaged position are permitted to escape from the engaged position. By disposing the sleeve 73 at the permitted position, the state in which the tool accessory is fixed by the balls 71 becomes releasable.

The coil spring 74 generates an elastic force to move the sleeve 73 toward the blocked position. The coil spring 74 is disposed around the anvil-shaft portion 101. The blocked position is defined more rearward than the permitted position. The coil spring 74 generates an elastic force that urges the sleeve 73 to move rearward.

The positioning member 75 is a ring-shaped member that is fixed to the outer circumferential surface of the anvil-shaft portion 101. The positioning member 75 is fixed at a position at which it is opposable to a rear-end portion of the sleeve 73. The positioning member 75 positions the sleeve 73 at the blocked position. The sleeve 73, to which the rearward-moving elastic force of the coil spring 74 is imparted, is positioned at the blocked position when it contacts the positioning member 75.

The fan 12 is disposed more rearward than the stator 26 of the motor 6. The fan 12 generates an airflow for cooling the motor 6. The fan 12 is fixed to at least a portion of the rotor 27. The fan 12 is fixed to a rear portion of the rear-side shaft portion 33R via a bushing 12A. The fan 12 is disposed between the rear-side rotor bearing 39R and the stator 26. The fan 12 rotates when the rotor 27 rotates. By rotating the rotor-shaft portion 33, the fan 12 rotates together with the rotor-shaft portion 33. By rotating the fan 12, air exterior of the housing 2 flows into the interior space of the housing 2 via the air-intake ports 19. Air that has flowed into the interior space of the housing 2 flows through the interior space of the housing 2 and thereby cools the motor 6. By rotating the fan 12, air that has flowed through the interior space of the housing 2 flows out to the exterior of the housing 2 via the air-exhaust ports 20.

The battery-mounting part 13 is disposed on (at) a lower portion of the battery-holding part 23. The battery-mounting part 13 is connected to a battery pack 25. The battery pack 25 is mounted on the battery-mounting part 13. In the embodiment, there is one battery-mounting part 13. One battery pack 25 is mounted on the battery-mounting part 13. The battery pack 25 is detachable from the battery-mounting part 13. The battery pack 25 is mounted on the battery-mounting part 13 by being inserted into the battery-mounting part 13 from forward of the battery-holding part 23. The battery pack 25 is removed from the battery-mounting part 13 by being pulled forward from the battery-mounting part 13. The battery pack 25 comprises secondary batteries. In the embodiment, the battery pack 25 comprises rechargeable lithium-ion batteries. When mounted on the battery-mounting part 13, the battery pack 25 can supply electric power to the impact tool 1. The motor 6 is driven using the electric power supplied from the battery pack 25. The operation-and-display part 16 operates using electric power supplied from the battery pack 25.

The rated voltage of the battery pack 25 is 18 V or more. The rated voltage of the battery pack 25 may be 18 V, 36 V, or 72 V.

The trigger lever 14 is provided on the grip part 22. The trigger lever 14 is manipulated by the user to start the motor 6. The motor 6 switches between being driven and being stopped by the manipulation of the trigger lever 14.

The forward/reverse-change lever 15 is provided at an upper portion of the grip part 22. The forward/reverse-change lever 15 is manipulated by the user. By manipulating (pushing, sliding) the forward/reverse-change lever 15, the rotational direction of the motor 6 switches from one of the forward-rotational direction and the reverse-rotational direction to the other. Switching the rotational direction of the motor 6 switches the rotational direction of the spindle 8.

The operation-and-display part 16 is provided on the battery-holding part 23. The operation-and-display part 16 is provided on an upper surface of the battery-holding part 23 more on the forward side than the grip part 22. The operation-and-display part 16 comprises a plurality of manipulatable buttons 16A. By manipulating (pressing) one of the manipulatable buttons 16A, the user can switch (changed, cycled) the action mode of the motor 6 is switched.

The mode-change switch 17 is provided at an upper portion of the trigger lever 14. The user can also manipulate (press) the mode-change switch 17 to switch (change, cycle) the action mode of the motor 6.

The light assembly 18 emits illumination light. The light assembly 18 illuminates the anvil 10 and the periphery of the anvil 10 with the illumination light. The light assembly 18 illuminates forward of the anvil 10 with the illumination light. Additionally, the light assembly 18 illuminates the tool accessory that is mounted on the anvil 10 and the periphery of the tool accessory with the illumination light. In the embodiment, the light assembly 18 comprises a ring-shaped base member 18A and a plurality of light-emitting devices 18B that are held by the base member 18A. The base member 18A is disposed around the second tube portion 402 of the hammer case 4. Additionally, the light assembly 18 includes a ring member 18C that restrains (blocks) the base member 18A from coming off of the second tube portion 402 forward.

In the embodiment, a ring member 61 is disposed between the anvil-projection portions 102 and the bearing 46B, which is the rear-side bearing. The ring member 61 is a member having circular band (washer) shape. The ring member 61 is made of a metal. Iron is an illustrative example of a metal for forming the ring member 61. A front surface and a rear surface of the ring member 61 are each flat. At least a portion of the rear surface of the ring member 61 is disposed so as to oppose the front surfaces of the anvil-projection portions 102. At least a portion of the front surface of the ring member 61 contacts a rear-end surface of the bearing 46B, which is the rear-side bearing.

In the embodiment, a restraining member 62, which engages with the hammer case 4 and the ring member 61, is provided. The restraining member 62 restrains (blocks) the ring member 61 from coming off rearward. A snap ring and a C-ring are illustrative examples of the restraining member 62. The restraining member 62 is disposed so as to contact the ring member 61.

The hammer case 4 has a support surface 4A that opposes at least a portion of the front surface of the ring member 61. The support surface 4A of the hammer case 4 and the rear-end surface of the bearing 46B, which is the rear-side bearing, are disposed substantially within the same plane. At least a portion of the ring member 61 is disposed between the front surfaces of the anvil-projection portions 102 and the support surface 4A of the hammer case 4.

The ring member 61 blocks contact between the hammer case 4 and the anvil-projection portions 102.

At least a portion of the front surface of the ring member 61 contacts the support surface 4A of the hammer case 4. Additionally, at least a portion of the front surface of the ring member 61 contacts the rear-end surface of the bearing 46B, which is the rear-side bearing.

A front-surface, outer-edge portion, which is an outer-edge portion of the front surface of the ring member 61, contacts the support surface 4A of the hammer case 4. A front-surface, inner-edge portion, which is an inner-edge portion of the front surface of the ring member 61, is capable of contacting a rear-end surface of the outer ring of the bearing 46B. The ring member 61 is disposed more radially outward than the inner ring of the bearing 46B. The ring member 61 and the inner ring of the bearing 46B do not make contact.

A rear-surface, outer-edge portion, which indicates an outer-edge portion of the rear surface of the ring member 61, contacts the restraining member 62.

A groove 4B, in which at least a portion of the restraining member 62 fits, is provided in an inner surface of the first tube portion 401 of the hammer case 4. Fluctuation in the relative positions of the hammer case 4 and the restraining member 62 is curtailed in at least the axial direction owing to the restraining member 62 being disposed in the groove 4B.

The bearings 46 are restrained (blocked) from coming off rearward (the other side in the axial direction) by the ring member 61 and the restraining member 62.

Front-surface, outer-edge portions, which indicate outer-edge portions of the front surfaces of the anvil-projection portions 102, tilt rearward as they go radially outward.

The restraining member 62 is disposed between the front-surface, outer-edge portions of the anvil-projection portions 102 and the rear-surface, outer-edge portion of the ring member 61 in the front-rear direction.

Spindle

Figure 5:
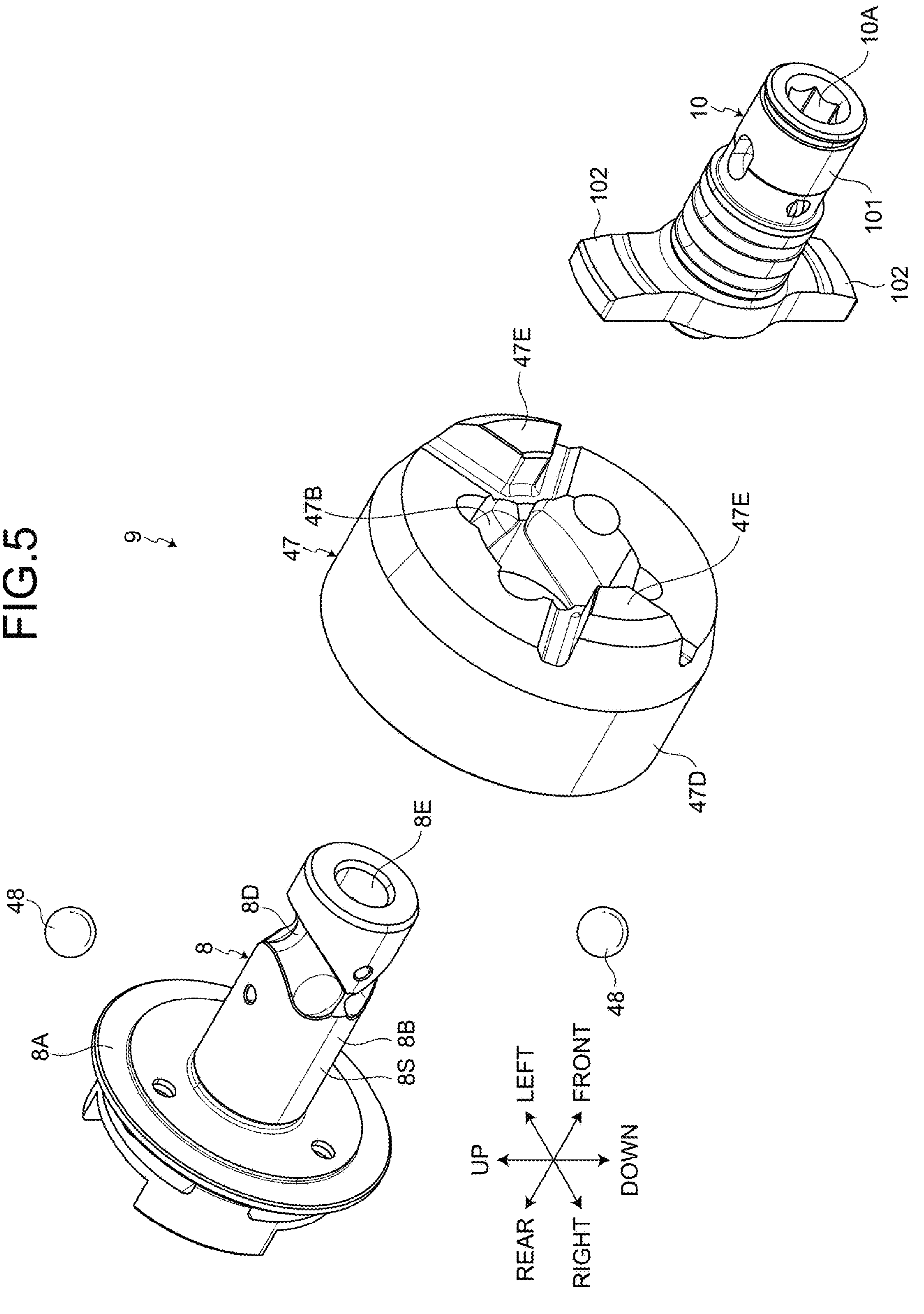
FIG. 5 is an exploded, oblique view, viewed from the front, that shows a portion of an impact mechanism according to the embodiment.
Figure 6:
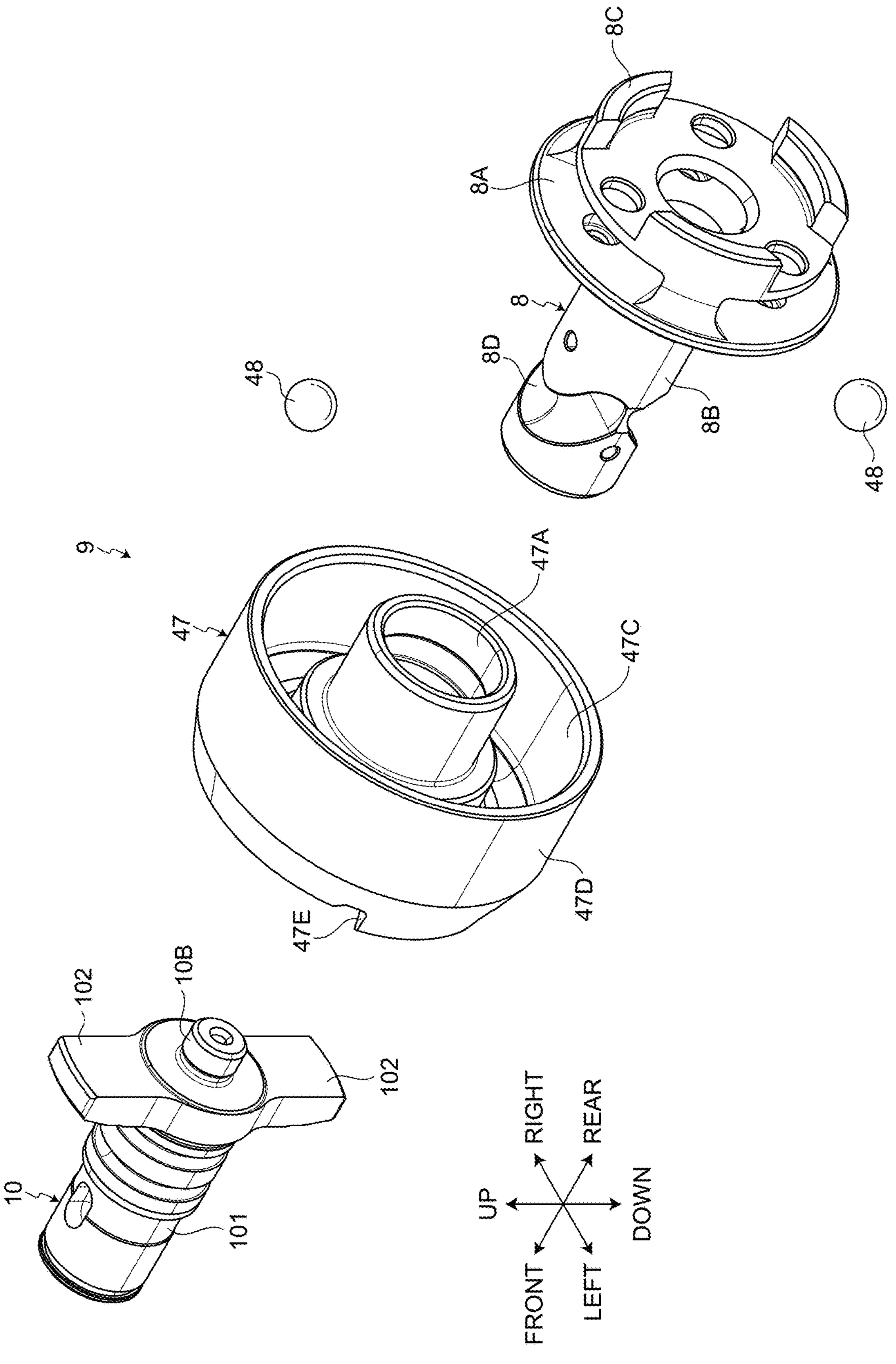
FIG. 6 is an exploded, oblique view, viewed from the rear, that shows a portion of the impact mechanism according to the embodiment.
Figure 7:
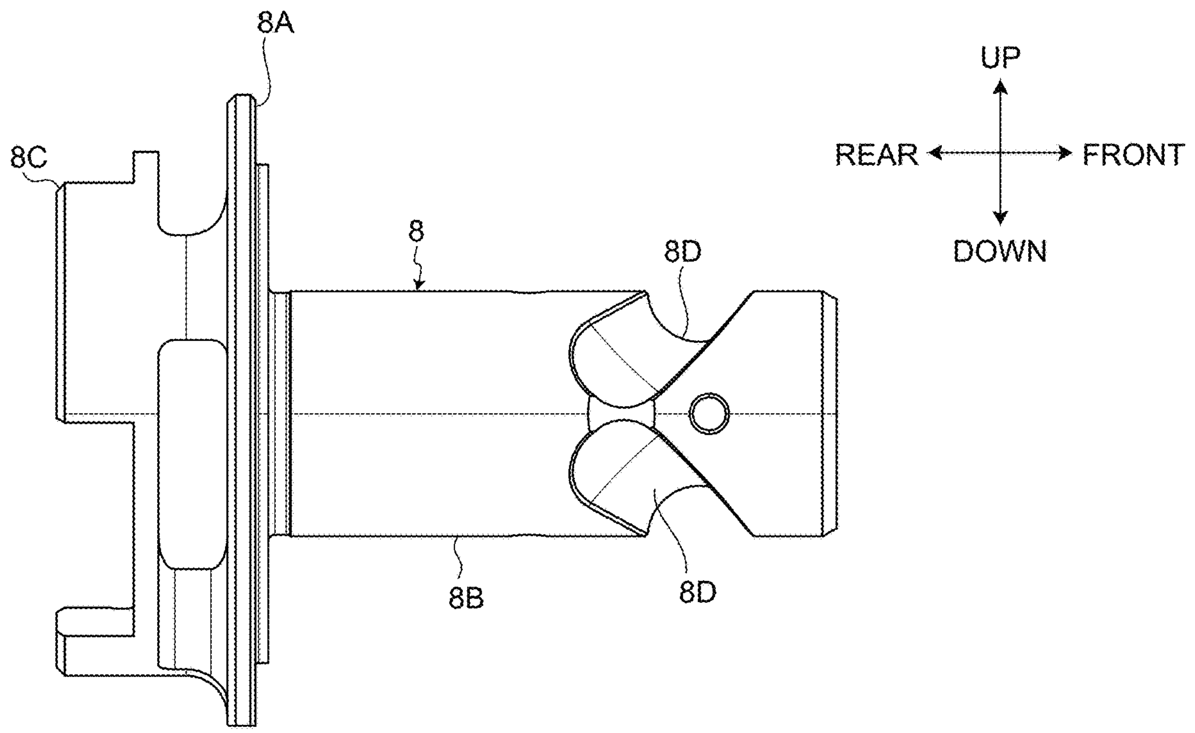
FIG. 7 is a side view that shows a spindle according to the embodiment.
Figure 8:
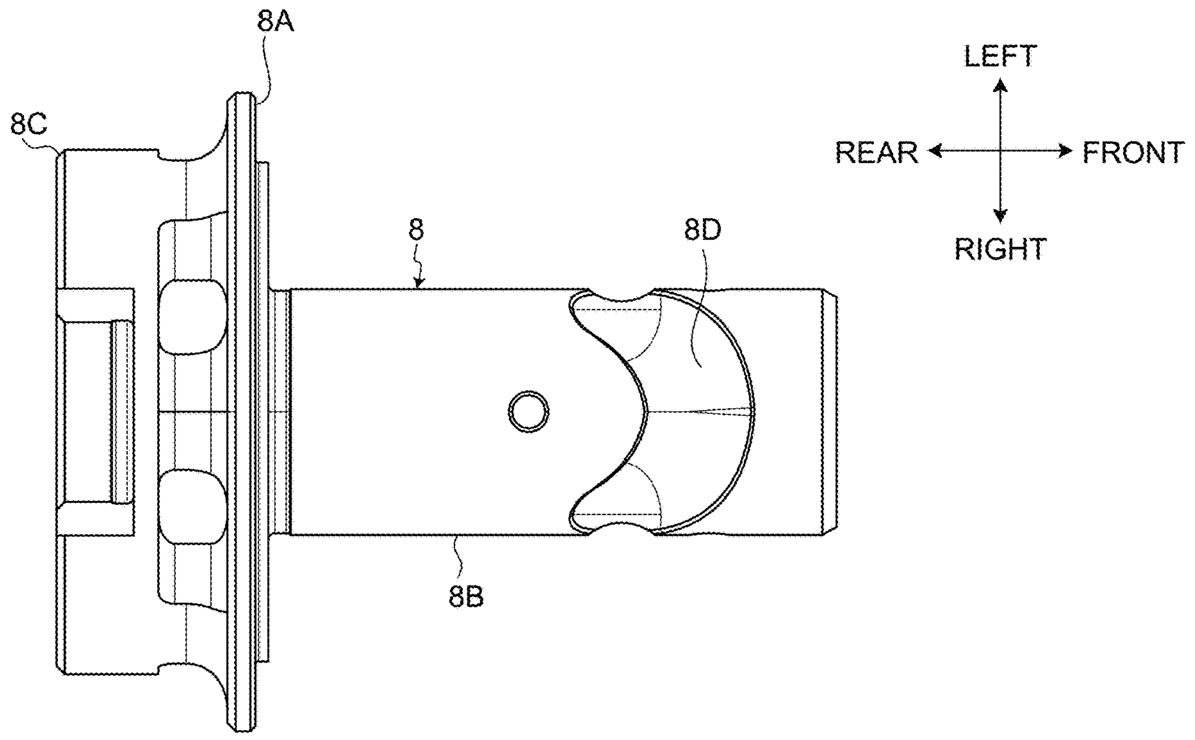
FIG. 8 is a top view that shows the spindle according to the embodiment.
Figure 9:
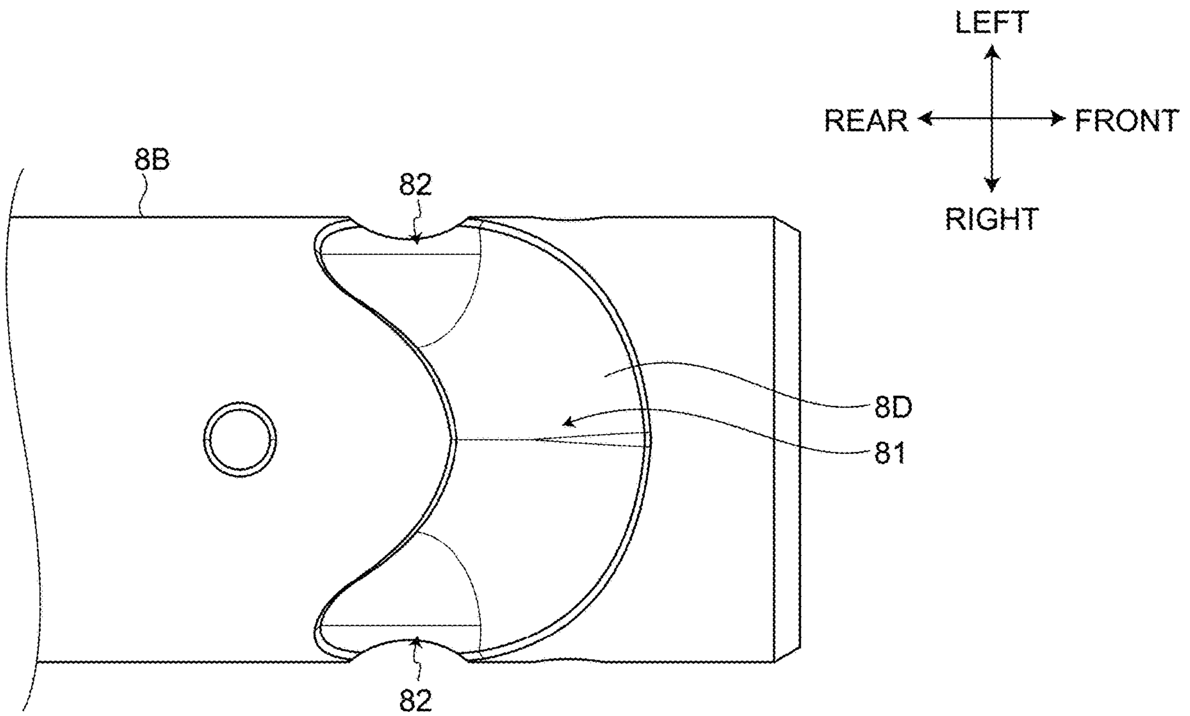
FIG. 9 is a top view that shows a portion of the spindle according to the embodiment.
Figure 10:
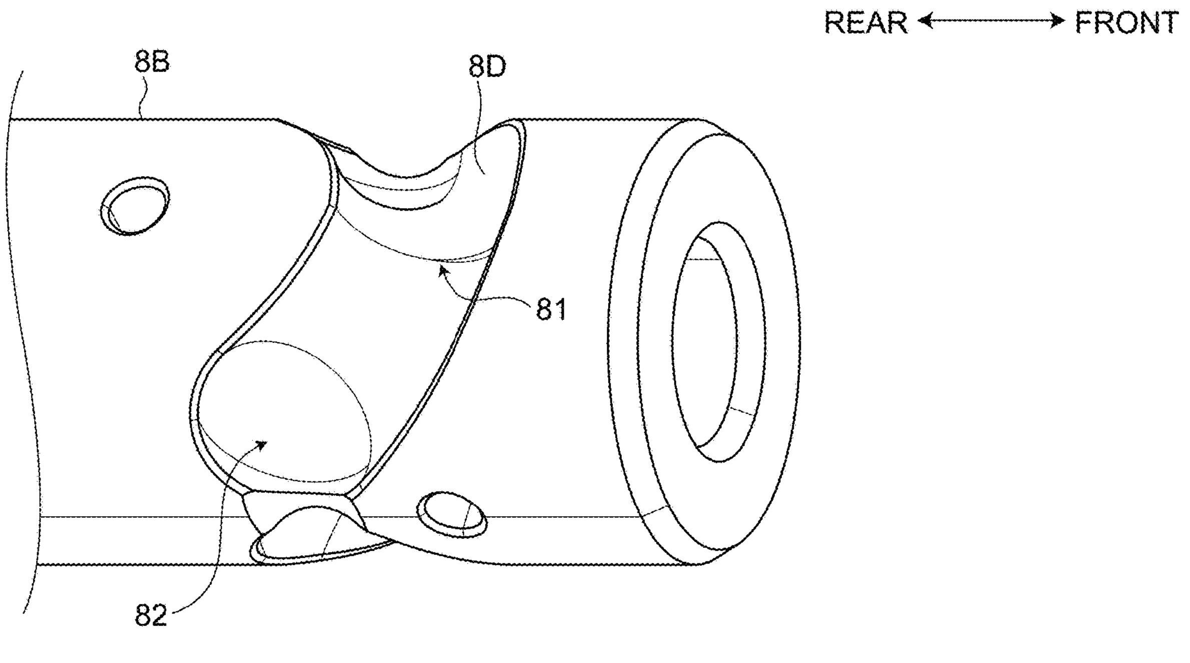
FIG. 10 is an oblique view that shows a portion of the spindle according to the embodiment.
Figure 11:
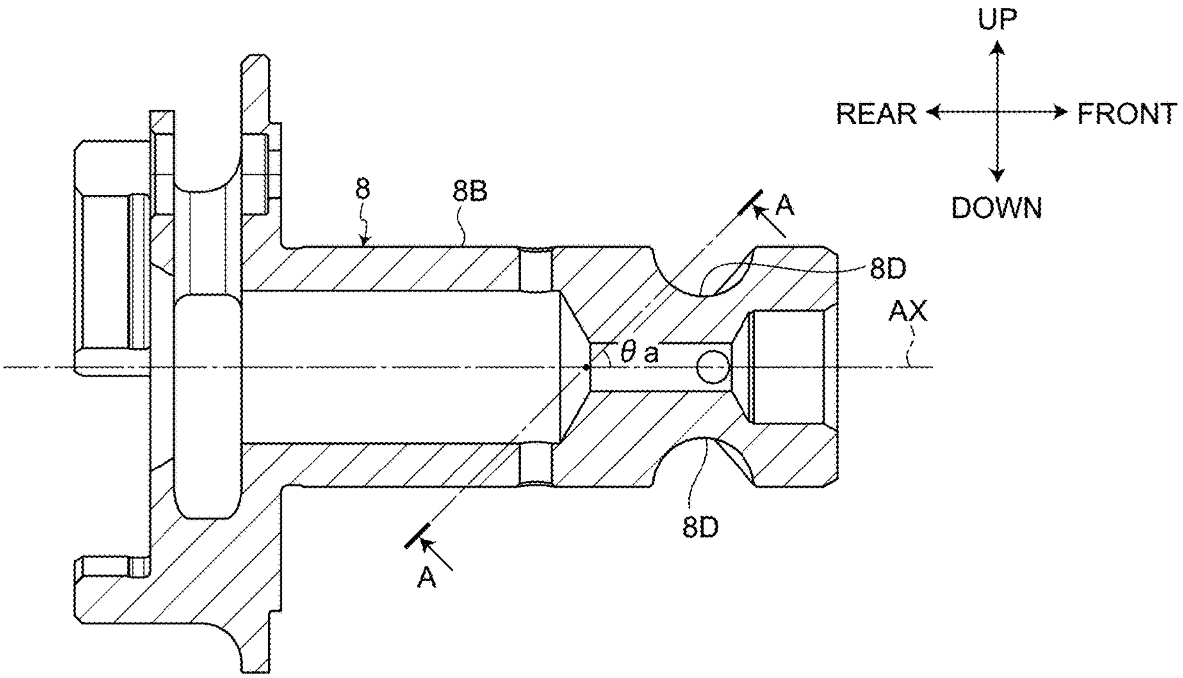
FIG. 11 is a longitudinal, cross-sectional view that shows the spindle according to the embodiment.
Figure 12:
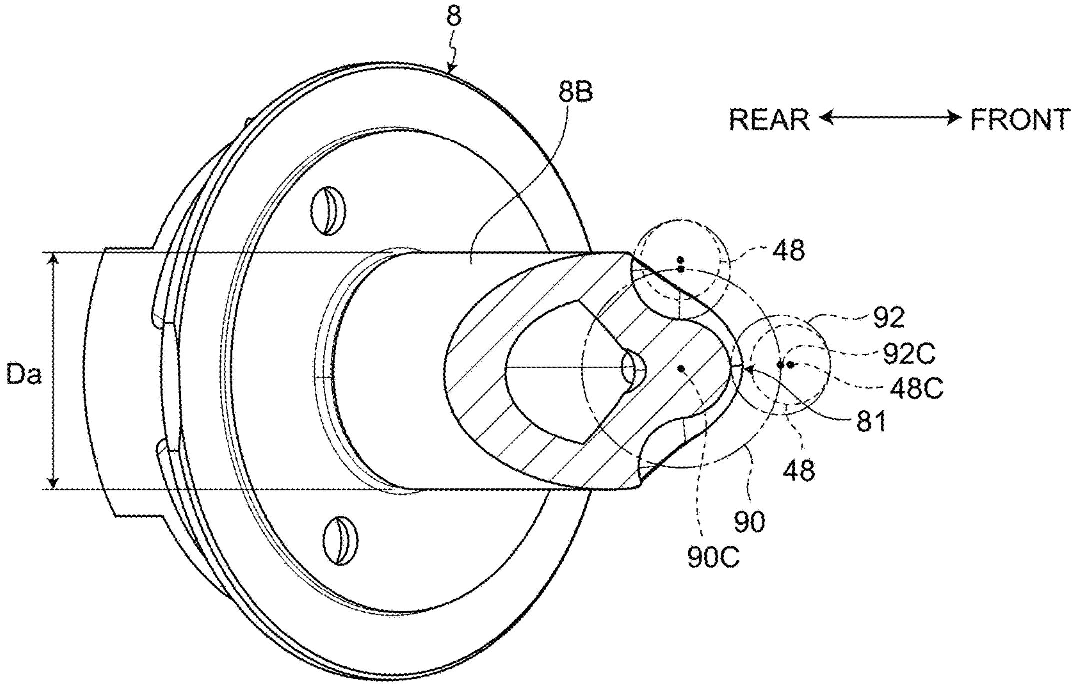
FIG. 12 is a cross-sectional view that shows the spindle according to the embodiment.
Figure 13:
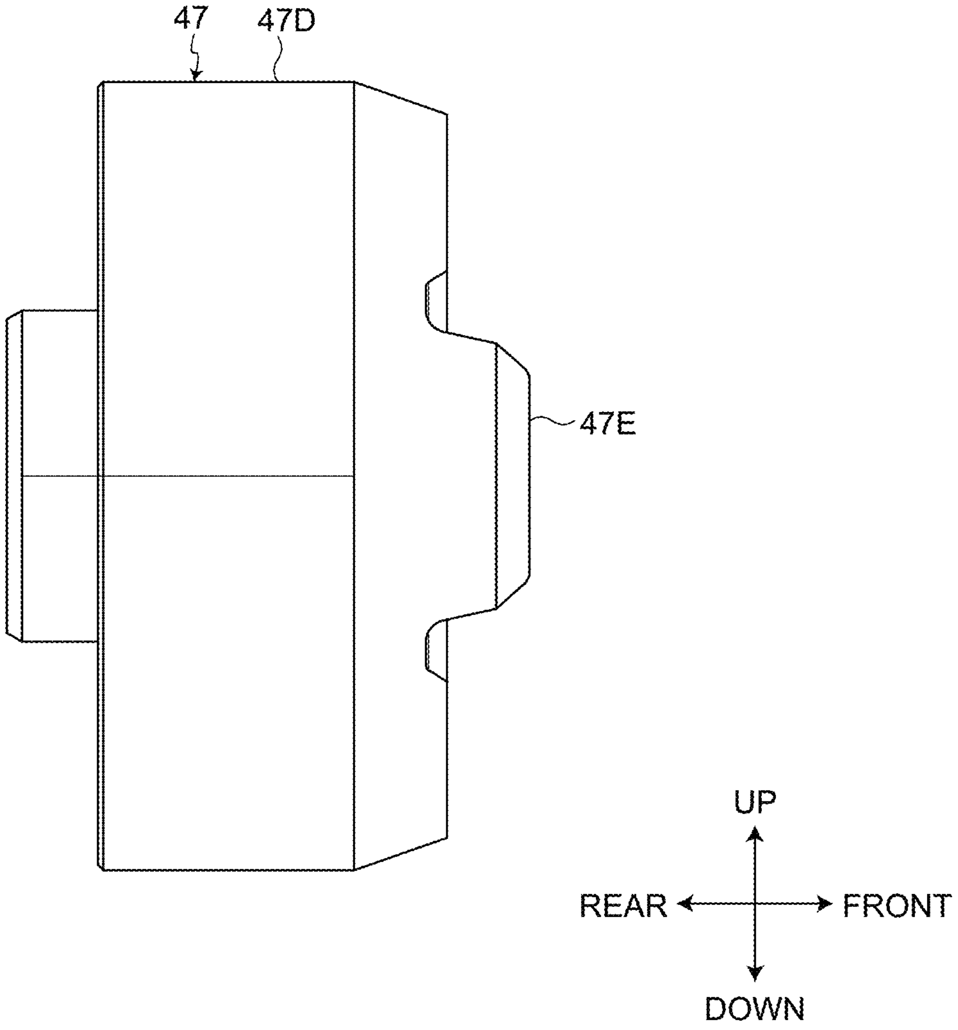
FIG. 13 is a side view that shows a hammer according to the embodiment.
Figure 14:
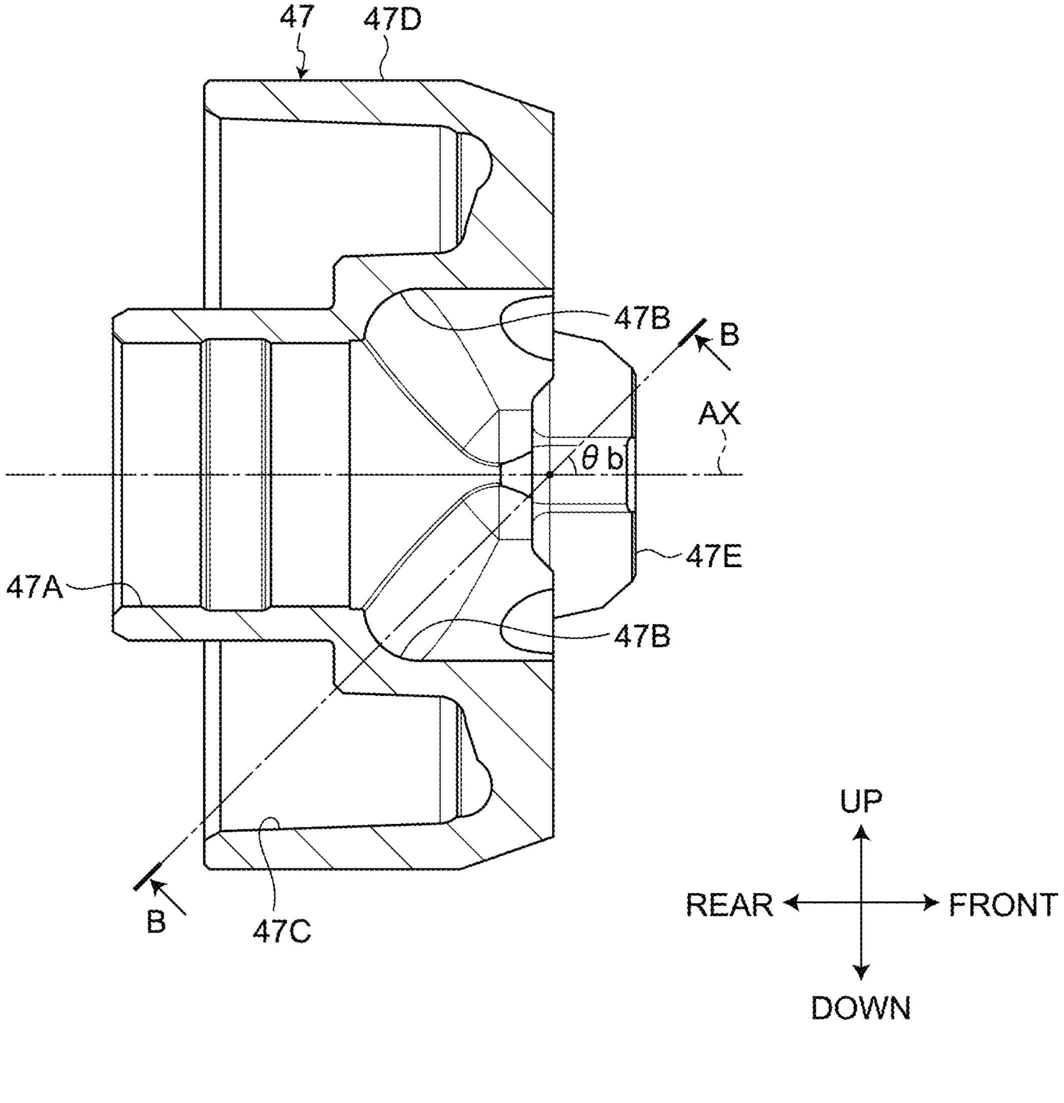
FIG. 14 is a longitudinal, cross-sectional view that shows the hammer according to the embodiment.
Figure 15:
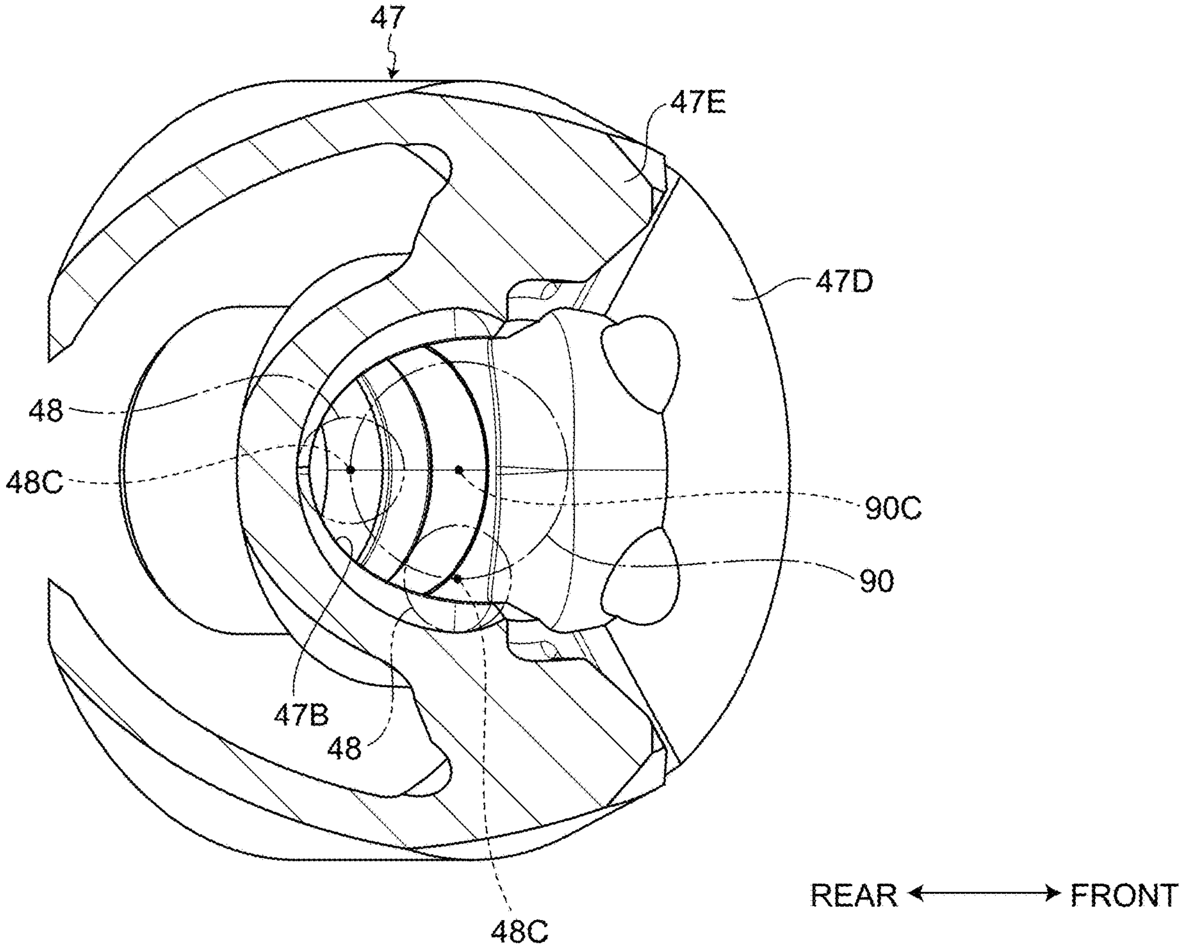
FIG. 15 is a cross-sectional view that shows the hammer according to the embodiment.
Figure 16:
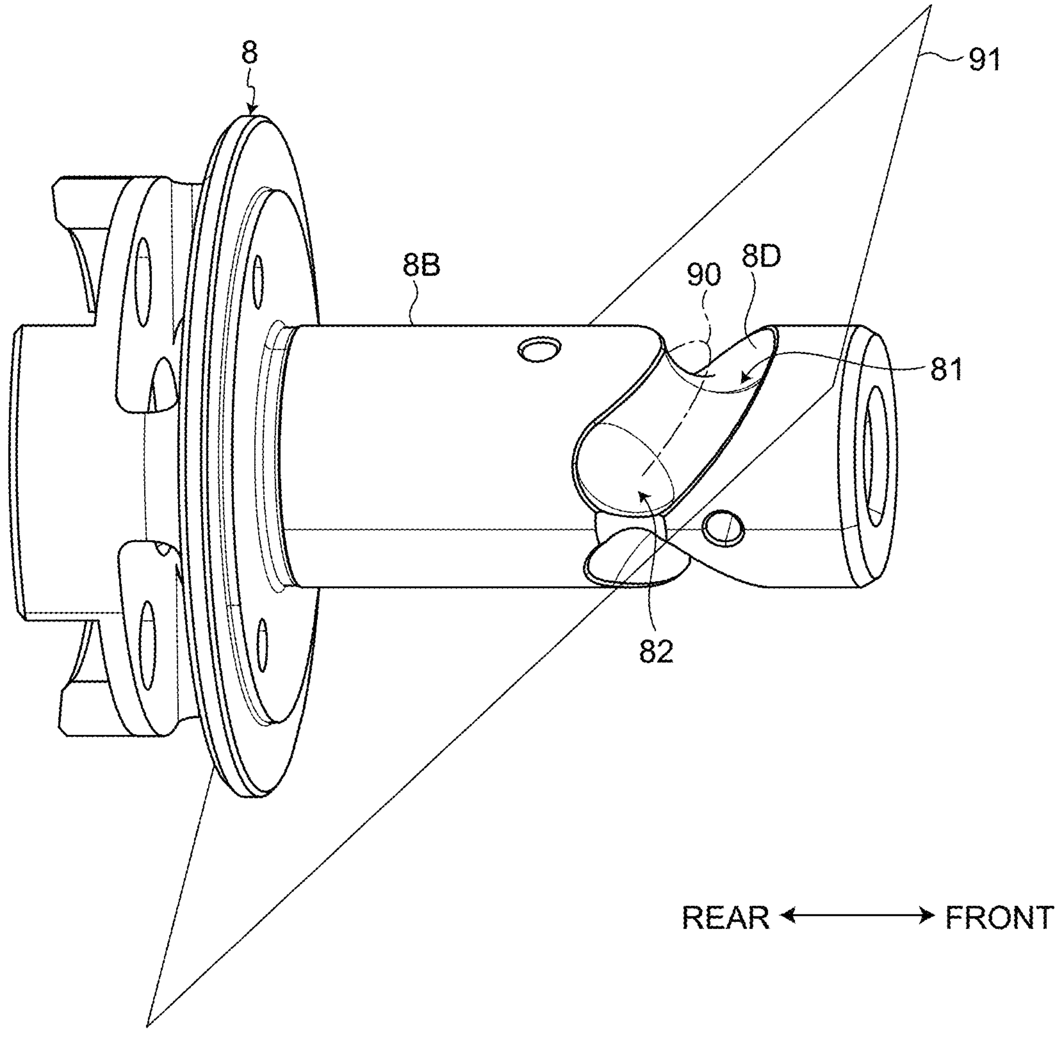
FIG. 16 is an oblique view that shows the spindle according to the embodiment.

FIG. 5 is an exploded, oblique view, viewed from the front, that shows a portion of the impact mechanism 9 according to the embodiment. FIG. 6 is an exploded, oblique view, viewed from the rear, that shows a portion of the impact mechanism 9 according to the embodiment. FIG. 7 is a side view that shows the spindle 8 according to the embodiment. FIG. 8 is a top view that shows the spindle 8 according to the embodiment. FIG. 9 is a top view that shows a portion of the spindle 8 according to the embodiment. FIG. 10 is an oblique view that shows a portion of the spindle 8 according to the embodiment. FIG. 11 is a longitudinal, cross-sectional view that shows the spindle 8 according to the embodiment. FIG. 12 is a cross-sectional view that shows the spindle 8 according to the embodiment and corresponds to a cross-sectional auxiliary view taken along line A-A in FIG. 11. FIG. 13 is a side view that shows the hammer 47 according to the embodiment. FIG. 14 is a longitudinal, cross-sectional view that shows the hammer 47 according to the embodiment. FIG. 15 is a cross-sectional view that shows the hammer 47 according to the embodiment and corresponds to a cross-sectional auxiliary view taken along line B-B in FIG. 14. FIG. 16 is an oblique view that shows the spindle 8 according to the embodiment.

The spindle 8 is disposed more forward than the motor 6. The spindle 8 is rotated about rotational axis AX in response to energization of the motor 6. The spindle grooves 8D are formed in the spindle 8. The spindle 8 comprises the flange portion 8A and the spindle-shaft portion 8B, which protrudes forward from the flange portion 8A. Two of the spindle grooves 8D are formed in the spindle-shaft portion 8B. The balls 48 are held in the spindle grooves 8D. One ball 48 is held in one corresponding spindle groove 8D.

Each of the spindle grooves 8D has a center portion 81 and a pair of end portions 82. The location of the center portion 81 and the location of the end portions 82 differ in the circumferential direction. One of the end portions 82 is disposed more toward one side than the center portion 81 in the circumferential direction, and the other end portion 82 is disposed more toward the other side than the center portion 81 in the circumferential direction. The end portions 82 of each of the spindle grooves 8D are disposed more rearward than the center portion 81 of the spindle groove 8D.

As shown in FIG. 11, FIG. 12, and FIG. 16, the balls 48 move with circular motion in a virtual plane 91, which is tilted by a prescribed angle θa from rotational axis AX of the spindle 8, in the state in which the balls 48 are held in the spindle grooves 8D. Each of the spindle grooves 8D forms an arcuate shape in the virtual plane 91. Prescribed angle θa is 45°. It is noted that prescribed angle θa need not be 45°, and may be an arbitrary angle of, for example, 30° or more and 60° or less.

As shown in FIG. 14 and FIG. 15, the balls 48 move with circular motion in the virtual plane 91, which is tilted by a prescribed angle θb from rotational axis AX of the hammer 47, in the state in which the balls 48 are held in the hammer grooves 47B. Each of the hammer grooves 47B forms an arcuate shape in the virtual plane 91. Prescribed angle θb is 45°.

That is, the spindle grooves 8D and the hammer grooves 47B have arcuate shapes, respectively, in the virtual plane 91.

The spindle grooves 8D are formed by a cutting tool 92 such as an end mill. As shown in FIG. 12, the cutting tool 92 moves with circular motion so as to move along a virtual circle 90, which is defined by the virtual plane 91. As shown in FIG. 12, etc., the center 90C of the virtual circle 90 is defined at a location that is offset from rotational axis AX of the spindle 8. The diameter of the virtual circle 90 is smaller than diameter Da of the spindle-shaft portion 8B. The center 92C of the cutting tool 92 moves along the virtual circle 90. The trajectory of the geometric center 92C (hereinafter, simply center 92C) of the cutting tool 92 enters within the width of the spindle-shaft portion 8B. The trajectory of the center 92C of the cutting tool 92 has an arcuate shape. When the spindle grooves 8D are being formed, at least a portion of the trajectory of the center 92C of the cutting tool 92 is disposed more radially inward than the outer circumferential surface 8S of the spindle-shaft portion 8B.

The center 92C of the cutting tool 92 is disposed more radially inward than the outer circumferential surface 8S of the spindle-shaft portion 8B for at least a portion of the formation of the spindle grooves 8D. The center 92C of the cutting tool 92 is disposed more radially inward than the outer circumferential surface 8S of the spindle-shaft portion 8B when forming the end portions 82 of the spindle grooves 8D. The center 92C of the cutting tool 92 is disposed more radially outward than the outer circumferential surface 8S of the spindle-shaft portion 8B when forming the center portions 81 of the spindle grooves 8D.

The balls 48 move with circular motion so as to move along the virtual circle 90 defined by the virtual plane 91. As shown in FIG. 12, etc., the center 90C of the virtual circle 90 is defined at a location that is offset from rotational axis AX of the spindle 8. A center 48C of each of the balls 48 moves more outward than the center of the virtual circle 90. The trajectory of the center 48C of each of the balls 48 enters within the width of the spindle-shaft portion 8B. The trajectory of the center 48C of each of the balls 48 has a substantially arcuate shape.

The depth of each of the spindle grooves 8D differs in accordance with its location in the axial direction (front-rear direction) of the spindle 8. In the embodiment, the depth at the rear portion of each of the spindle grooves 8D is deeper than the depth at the front portion of that spindle groove 8D. That is, the depth at the end portions 82 of each of the spindle grooves 8D is deeper than the depth at the center portion 81 of that spindle groove 8D. For example, and without limitation, the depth of the spindle grooves 8B at the end portions 82 is preferably at least 5% deeper than the depth of the spindle grooves 8B at the center portion 81, e.g., 5-15% deeper. In other words, a bottom or base of the spindle grooves 8B at the end portions 82 is preferably at least 5% greater from the outer circumferential surface 8S of the spindle-shaft portion 8B than the bottom or base of the spindle grooves 8B at the center portion 81, e.g., 5-15% greater.

The center 48C of each of the balls 48 may be disposed inside the corresponding spindle groove 8D at at least a portion of the corresponding spindle groove 8D. The center 48C of each of the balls 48 may be disposed inside the corresponding spindle groove 8D at the end portions 82 of the corresponding spindle groove 8D. The center 48C of each of the balls 48 may be disposed outside the corresponding spindle groove 8D at the center portion 81 of the corresponding spindle groove 8D. In other words, when each of the balls 48 is at one of the end portions 82, the center 48C of the balls 48 is disposed radially inward of the outer circumferential surface 8S of the spindle-shaft portion 8B, whereas when each of the balls 48 is at the center portions 81, the center 48C of the balls 48 is disposed radially outward of the outer circumferential surface 8S of the spindle-shaft portion 8B.

Operation of Impact Tool

Figure 17:
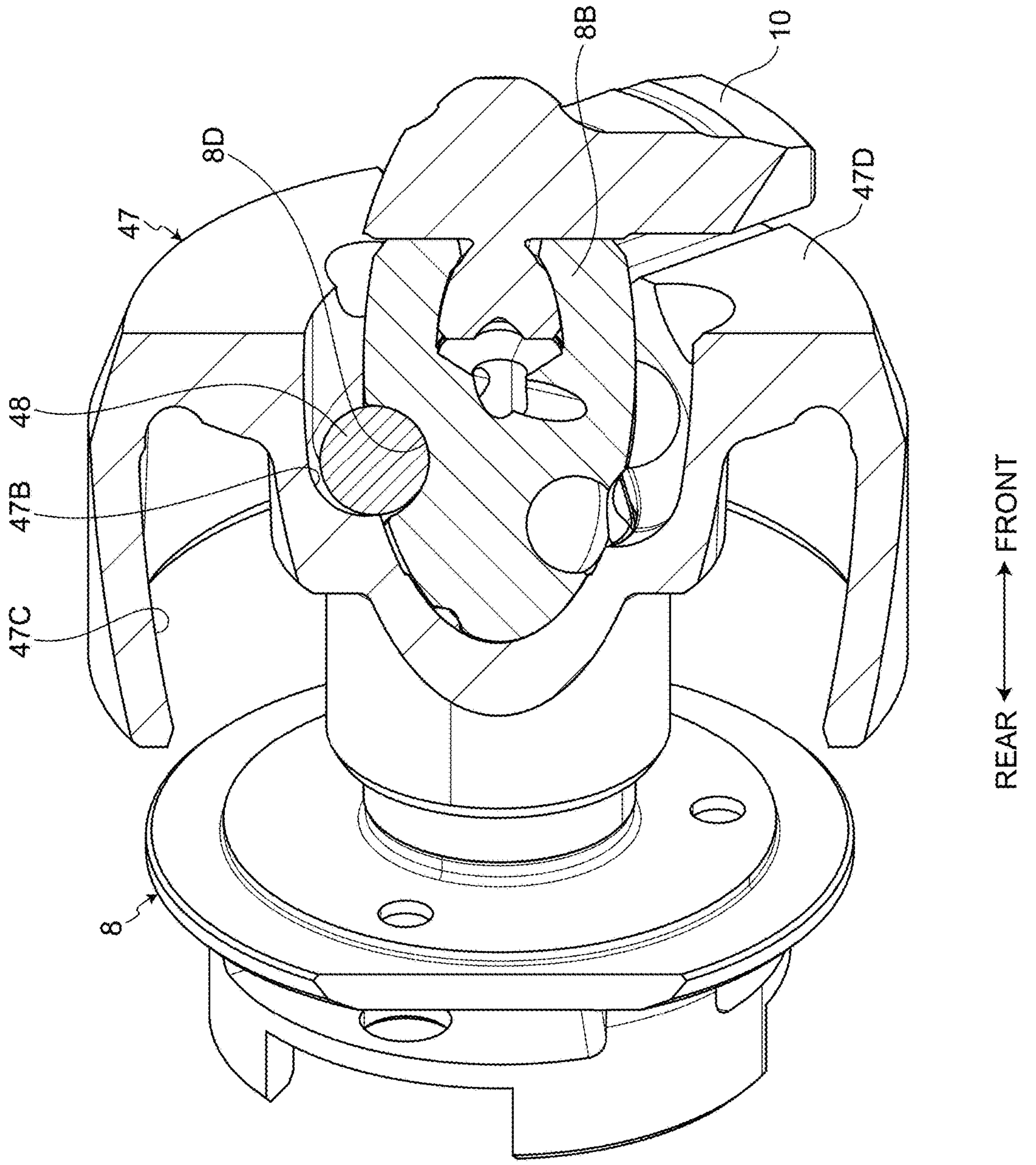
FIG. 17 is a cross-sectional view for explaining the operation of the impact mechanism according to the embodiment.
Figure 18:
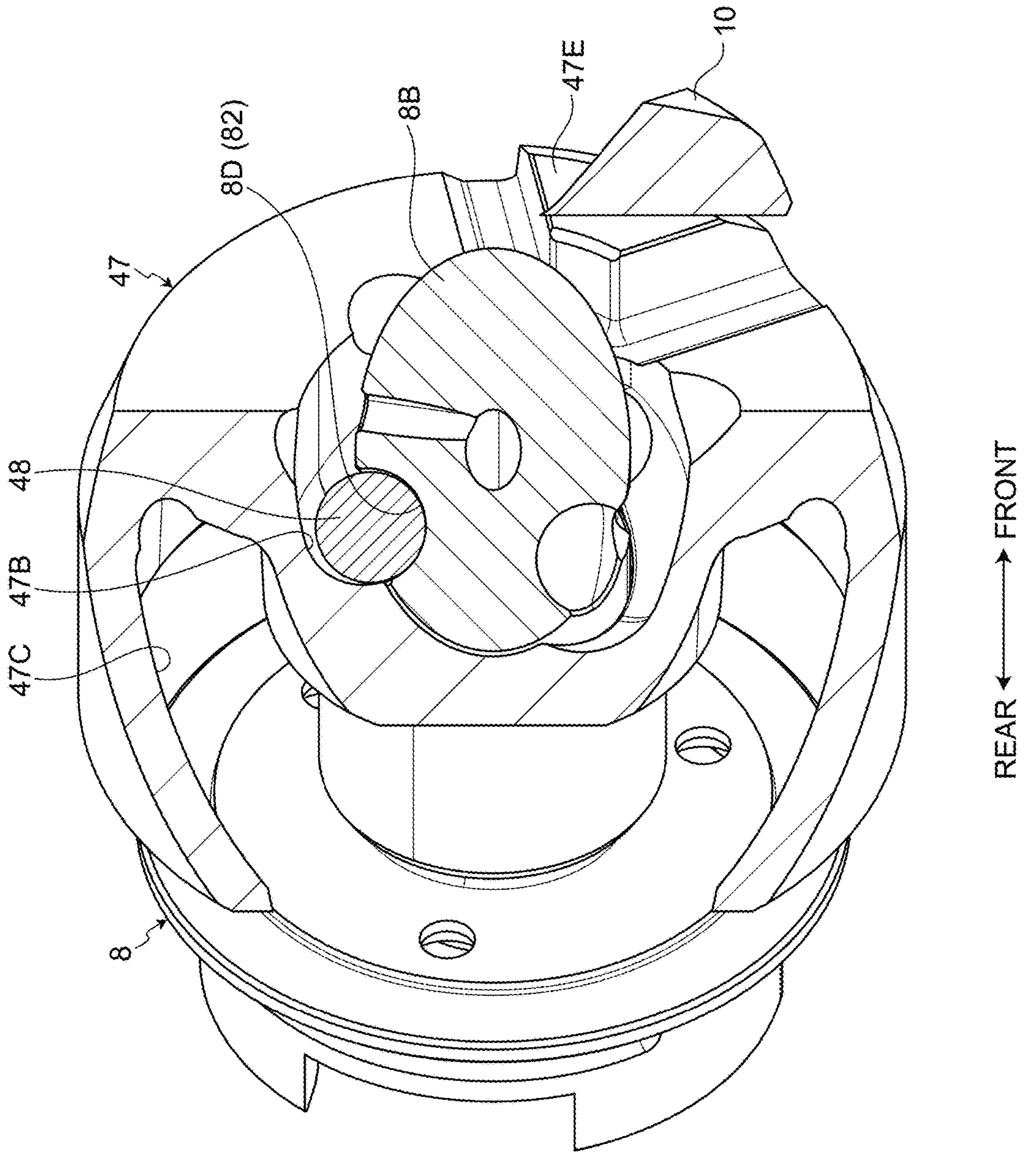
FIG. 18 is a cross-sectional view for explaining the operation of the impact mechanism according to the embodiment.
Figure 19:
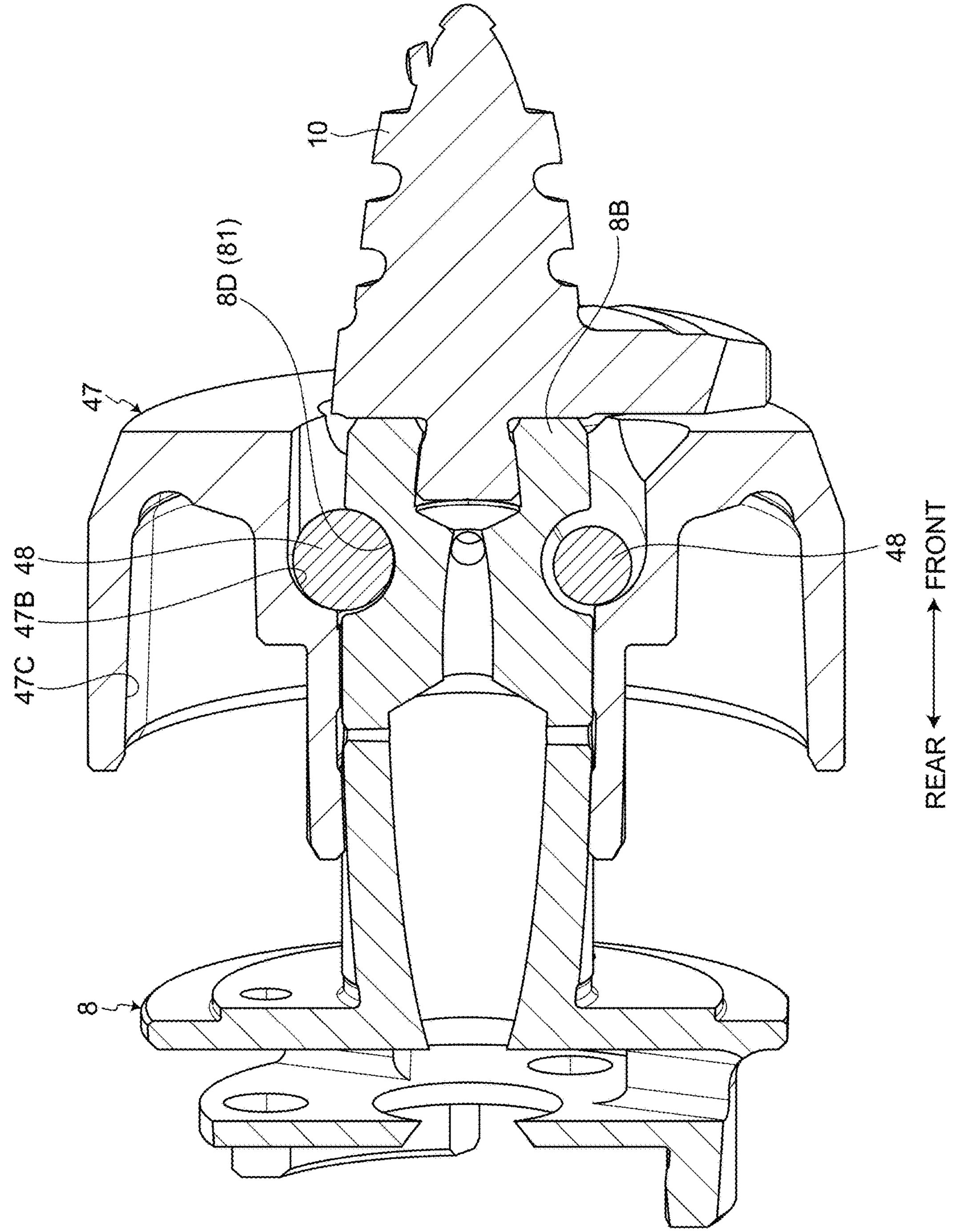
FIG. 19 is a cross-sectional view for explaining the operation of the impact mechanism according to the embodiment.

Next, the operation of the impact tool 1 will be explained. FIG. 17, FIG. 18, and FIG. 19 are each a cross-sectional view for explaining the operation of the impact mechanism 9 according to the embodiment.

When performing screw-tightening work on a work object (e.g., a Phillips-head screw), the tool accessory used for the screw-tightening work (a driver bit) is inserted in the tool hole 10A of the anvil 10. The tool accessory inserted into the tool hole 10A is held by the tool-holding mechanism 11. After mounting the tool accessory on (in) the anvil 10, the user grips the grip part 22 with, for example, their right hand and pulls the trigger lever 14. When the trigger lever 14 is pulled, electric power is supplied from the battery pack 25 to the motor 6, the motor 6 starts, and the light assembly 18 turns ON at the same time. Owing to the starting of the motor 6, the rotor-shaft portion 33 of the rotor 27 rotates. When the rotor-shaft portion 33 rotates, the rotational force of the rotor-shaft portion 33 is transmitted to the planet gears 42 via the pinion gear 41. Because the planet gears 42 are meshed with the inner teeth of the internal gear 43, the planet gears 42 revolve around the pinion gear 41 while rotating. The planet gears 42 are supported in a rotatable manner by the spindle 8 via the pins 42P. Owing to the revolving of the planet gears 42, the spindle 8 rotates at a rotational speed that is lower than the rotational speed of the rotor-shaft portion 33.

When the hammer 47 and the anvil-projection portions 102 are in continuous contact with each other and the spindle 8 rotates, the anvil 10 rotates together with the hammer 47 and the spindle 8. The screw-tightening work progresses owing to the rotation of the anvil 10. The rotational force of the spindle 8 is transmitted to the hammer 47 via the balls 48. The balls 48 are disposed at the center portions 81 of the spindle grooves 8D, respectively, while the spindle 8 and the hammer 47 are rotating together.

The rotation of the anvil 10 and the hammer 47 momentarily (intermittently) stops when, owing to the progress of the screw-tightening work, a load torque from the screw greater than or equal to a prescribed value acts on the anvil 10, e.g., when the screw has been driven deeply into a workpiece, such as a piece of wood. In the description below, the load torque when the rotation of the anvil 10 and the hammer 47 stops is called the stop-load torque where appropriate, and the point in time when the rotation of the anvil 10 and the hammer 47 has stopped is called the hammer-stop time where appropriate.

That is, when a torque equal to or greater than the stop-load torque from the screw acts on the anvil 10 during the screw-tightening work, the rotation of the anvil 10 and the hammer 47 momentarily stops. However, the spindle 8 will continue to rotate owing to the driving of the motor 6. Thus, as the spindle 8 continues to rotate in the state in which the rotation of the hammer 47 is momentarily stopped, the hammer 47 is caused to move rearward relative to the spindle 8.

Therefore, contact between the hammer 47 and the anvil-projection portions 102 is released when the hammer 47 has moved rearward relative to the spindle 8. In the description below, the point in time when the hammer 47 moves rearward relative to the spindle 8 and the contact between the hammer 47 and the anvil-projection portions 102 is released is called the hammer-release time where appropriate.

As shown in FIG. 17, at the hammer-release time, the balls 48 are disposed at the center portions 81 of the spindle grooves 8D.

When the contact between the hammer 47 and the anvil-projection portions 102 is released and the hammer 47 moves rearward relative to the spindle 8, the balls 48 move from the center portions 81 of the spindle grooves 8D to the end portions 82. At this time, the hammer 47 moves most rearward relative to the spindle 8 in the axial direction within the movable range of the hammer 47. In the description below, the point in time at which the hammer 47 moves most rearward relative to the spindle 8 is called the maximum-stroke time where appropriate.

As shown in FIG. 18, each of the balls 48 is disposed at one of the end portions 82 of the corresponding spindle groove 8D at the maximum-stroke time.

After having moved rearward, the hammer 47 is moved forward while rotating owing to the forward biasing forces of the first coil spring 49 and the second coil spring 50. As the hammer 47 moves forward relative to the spindle 8, each of the balls 48 moves from one of the end portions 82 to the center portion 81 of the corresponding spindle groove 8D. In the description below, the point in time at which the hammer 47 moves forward while rotating and immediately before the hammer 47 impacts the anvil 10 is called the impact-start time where appropriate. As shown in FIG. 17, at the impact-start time, the balls 48 are disposed at the center portions 81 of the spindle grooves 8D. Additionally, the point in time at which the hammer 47 impacts the anvil 10 in the rotational direction is called the impact time where appropriate.

The anvil 10 is impacted by the hammer 47 in the rotational direction owing to the hammer 47 moving forward while rotating. Thereby, the anvil 10 is rotated about rotational axis AX with a higher torque. Consequently, the screw is tightened into the work piece with a torque that is higher than the stop-load torque.

FIG. 19 shows the spindle 8, the balls 48, and the hammer 47 at the impact time.

In the description below, the torque acting on the anvil 10 when the hammer 47 starts impacting the anvil 10 is called the impact-start torque where appropriate. The impact-start torque is equal to the stop-load torque described above. That is, the impact-start torque is equal to the load torque from the screw acting on the anvil 10 when the rotation of the anvil 10 and the hammer 47 momentarily stops during the screw-tightening work.

Effects

The effects of the impact tool 1 according to the embodiment are described below while making a comparison to a spindle 800 according to a conventional example. In the description below, the spindle 8 according to the embodiment described above is called the working example where appropriate, and the spindle 800 according to the conventional example is called the comparative example where appropriate.

Figure 20:
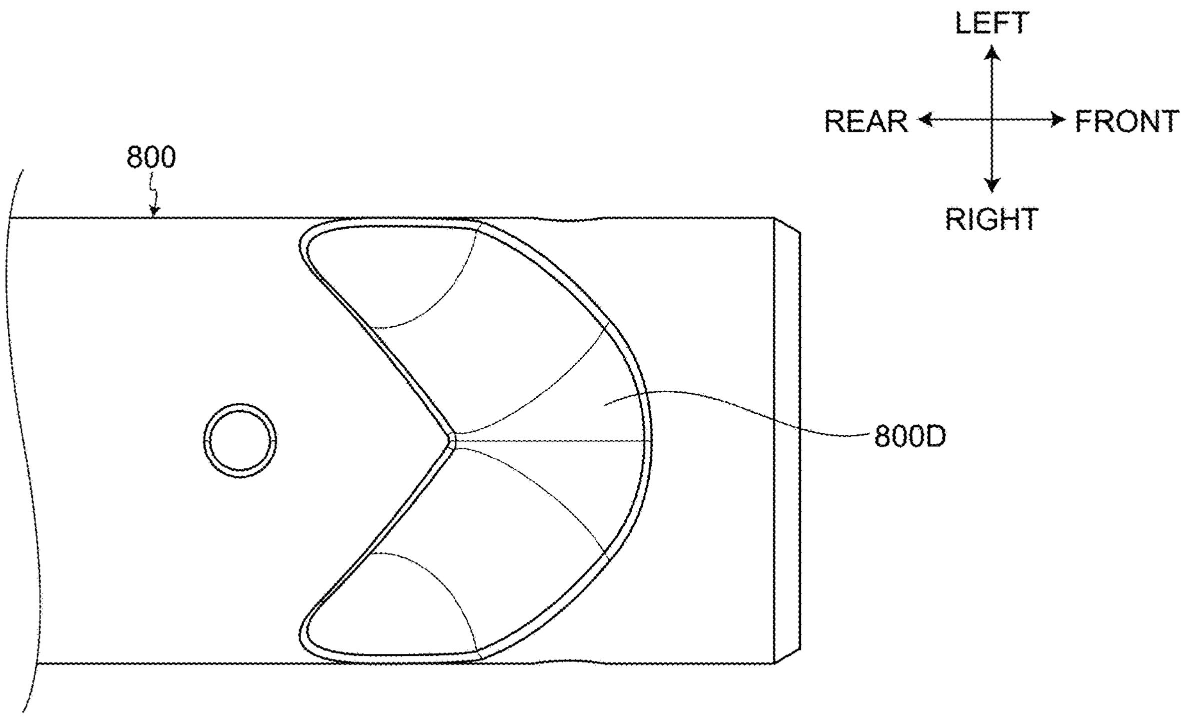
FIG. 20 is a top view that shows a portion of the spindle according to a comparative example.

FIG. 20 is a top view that shows a portion of the spindle 800 according to the comparative example. A spindle groove 800D is formed in a spindle-shaft portion 800B of the spindle 800 according to the comparative example. The spindle groove 800D, which has a V shape, is the spindle groove generally utilized for existing spindles. The depth at a center portion of the spindle groove 800D and the depth at end portions of the spindle groove 800D are substantially equal.

Figure 21:
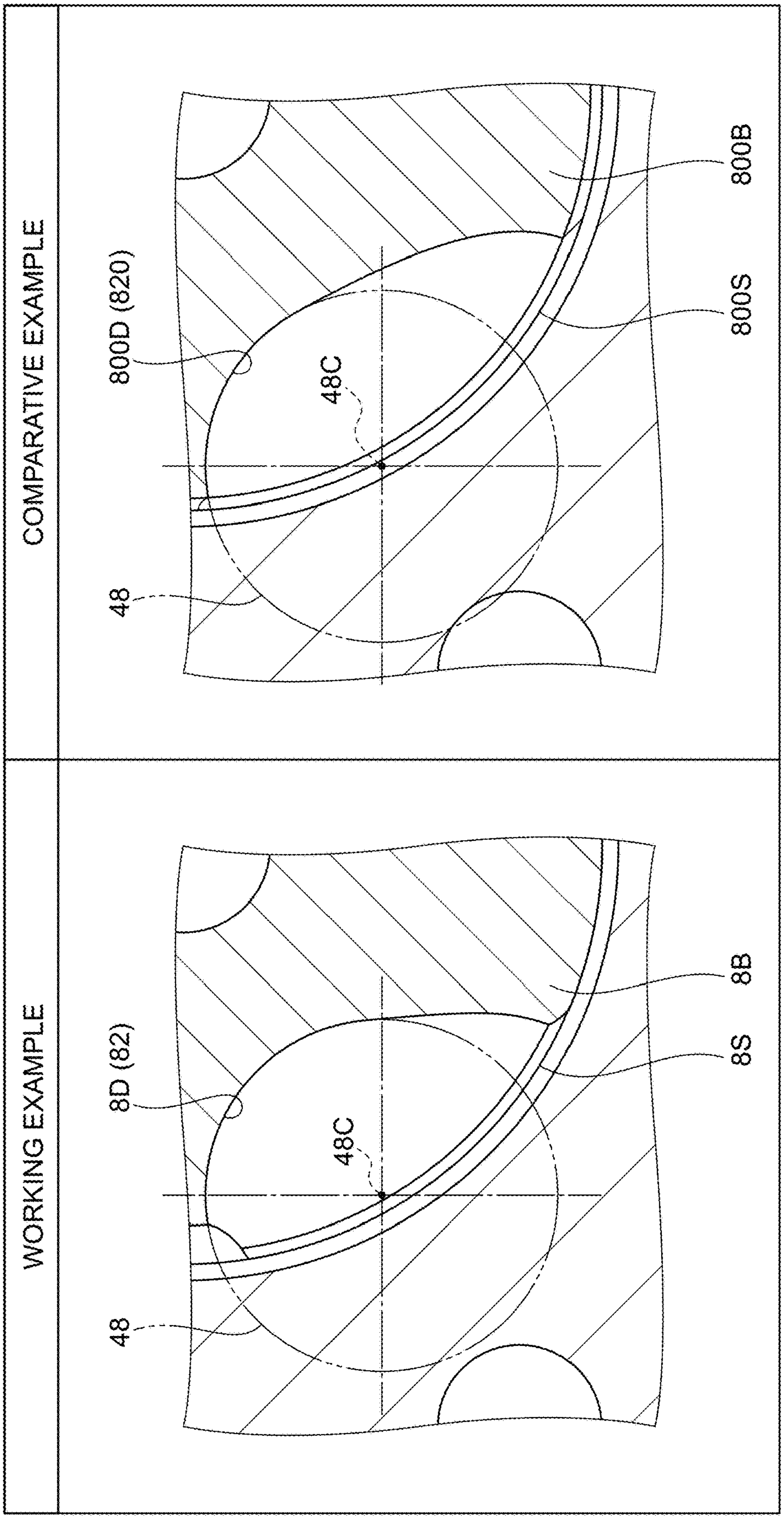
FIG. 21 is a drawing for explaining the relationship between the spindle and a ball according to a working example and a comparative example, respectively.

FIG. 21 is a drawing for explaining the relationship between the spindles 8, 800 and the balls 48 according to the working example and the comparative example, respectively.

As shown in FIG. 21, with regard to the spindle 8 according to the working example, at the end portion 82 of the spindle groove 8D, the center 48C of a ball 48 is disposed inside the spindle groove 8D; i.e. the center 48C is below the outer circumferential surface 8S of the spindle-shaft portion 8B. The depth at the end portions 82 of the spindle groove 8D is deeper than the depth at the center portion 81 of the spindle groove 8D. Therefore, when the ball 48 is disposed at the end portion 82, the ball 48 sinks into the inside of the spindle groove 8D more than when the ball 48 is disposed at the center portion 81. That is, when the ball 48 is disposed at the end portion 82 of the spindle groove 8D, the distance between rotational axis AX and the center 48C in the radial direction is shorter than the distance between rotational axis AX and the outer circumferential surface 8S of the spindle-shaft portion 8B in the radial direction. When the ball 48 is disposed at the end portion 82 of the spindle groove 8D, the center 48C is disposed more radially inward than the outer circumferential surface 8S.

As shown in FIG. 21, with regard to the spindle 800 according to the comparative example, the depth at the center portion and the depth at the end portions of the spindle groove 800D are substantially equal. Therefore, the ball 48 is disposed more radially outward when the ball 48 is disposed at an end portion 820 of the spindle groove 800D than when the ball 48 is disposed at the end portion 82 of the spindle groove 8D according to the working example. In fact, the center 48C of the ball 48 is disposed radially outward of the outer circumferential surface 800S of the spindle-shaft portion 800B at both the end portion and the center portion.

Figure 22:
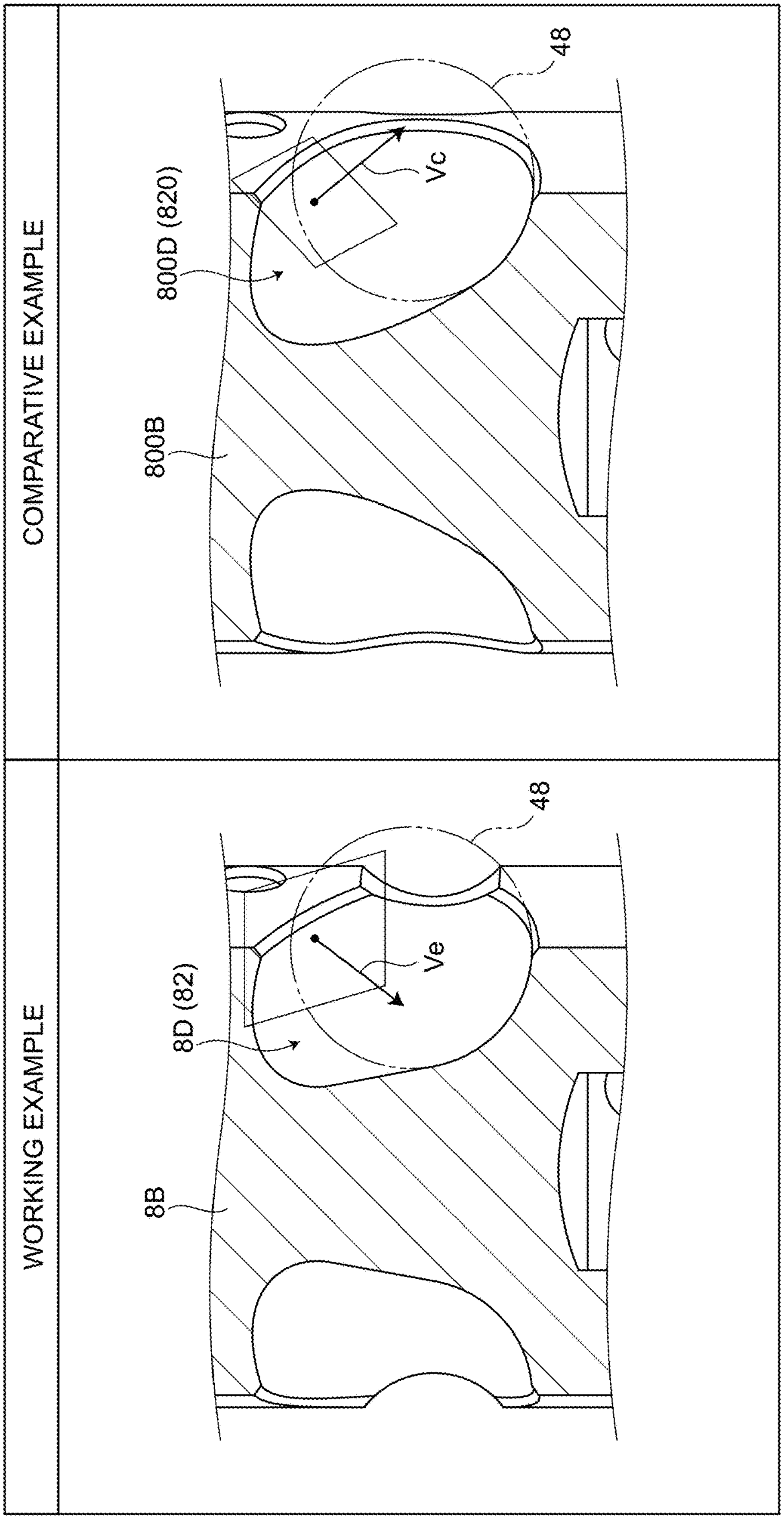
FIG. 22 is a drawing for explaining the force the ball receives from the spindle according to the working example and the comparative example, respectively.

FIG. 22 serves to explain the forces the ball 48 receives from the spindles 8, 800 according to the working example and the comparative example, respectively.

As shown in FIG. 22, with regard to the spindle 8 according to the working example, the ball 48 sinks radially inward when the ball 48 is disposed at the end portion 82 of the spindle groove 8D; therefore, among the forces acting between the spindle 8 and the ball 48, the component in the rotational direction becomes larger at the maximum-stroke time. That is, as shown by arrow Ve, the force acting on the ball 48 from the spindle 8 acts exclusively in the rotational direction. As described with reference to FIG. 18, the point in time at which each of the balls 48 is disposed at one of the end portions 82 of the corresponding spindle groove 8D is at the maximum-stroke time. Because the ball 48 receives a force that is exclusively in the rotational direction at the maximum-stroke time, the hammer 47 can move forward while rotating at a high rotational speed. Among the forces from the spindle 8 acting on the ball 48, the component in the axial direction is wasted force. Among the forces from the spindle 8 acting on the ball 48, because the component in the axial direction is small and the component in the rotational direction is large, the hammer 47 can move forward while rotating at a high rotational speed.

As shown in FIG. 22, with regard to the spindle 800 according to the comparative example, as shown by arrow Vc, among the forces from the spindle 800 acting on the ball 48, the component in the axial direction is larger when the ball 48 is disposed at the end portion 820 of the spindle groove 800D. In this situation, it is difficult to increase the rotational speed of the hammer 47.

Figure 23:
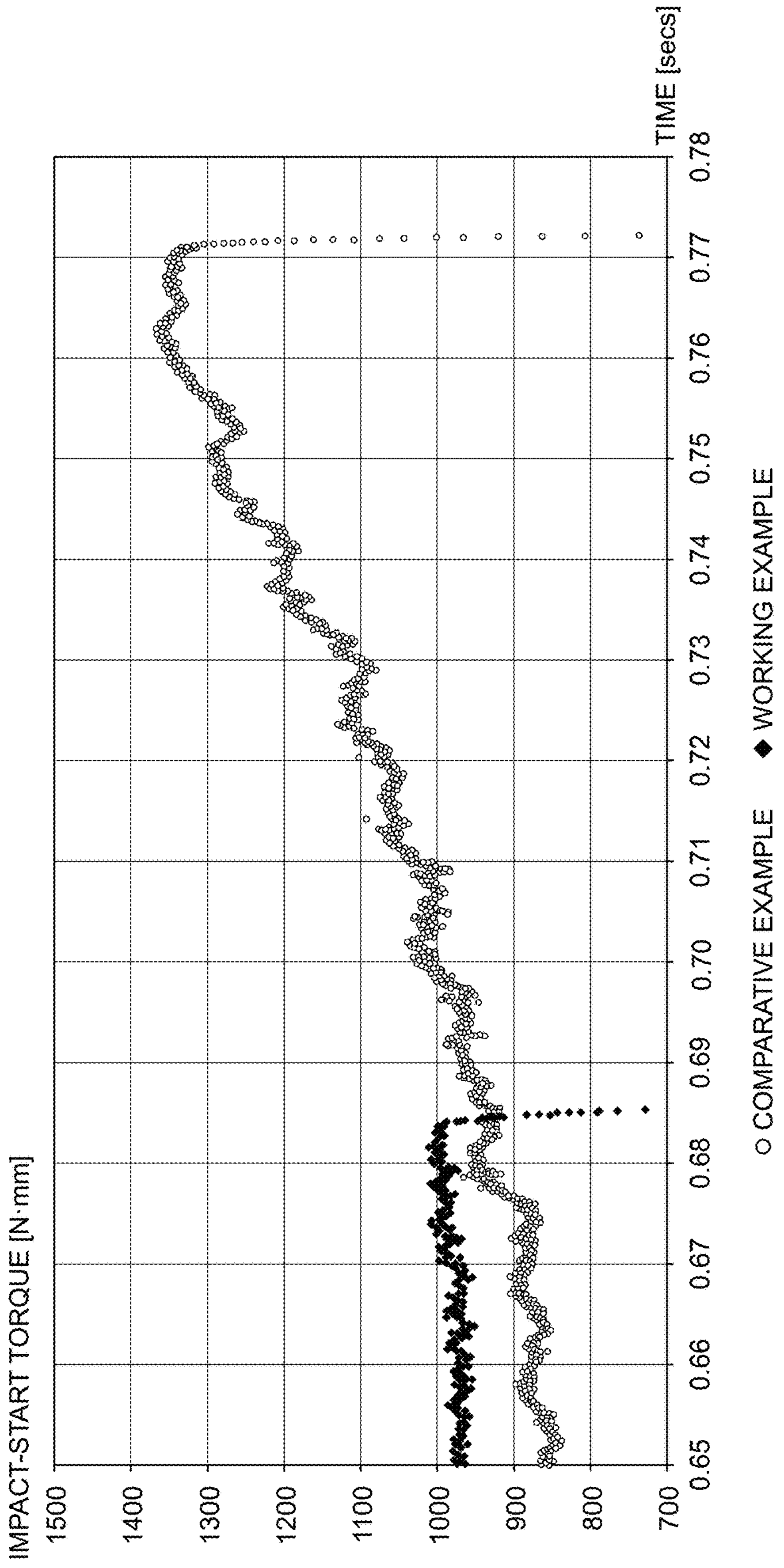
FIG. 23 is a graph for explaining the impact-start torque according to the working example and the comparative example, respectively.

FIG. 23 is a graph for explaining the impact-start torque according to the working example and the comparative example, respectively. In the graph shown in FIG. 23, the abscissa represents time elapsed since the start of the screw-tightening work. The ordinate represents the impact-start torque acting on the anvil 10. As described above, the impact-start torque is the torque acting on the anvil 10 when the hammer 47 begins to impact the anvil 10. The impact-start torque is equal to the stop-load torque from the screw acting on the anvil 10 when the rotation of the anvil 10 and the hammer 47 momentarily stops during the screw-tightening work.

As shown in FIG. 23, the impact-start torque is approximately 1,350 N·mm in the comparative example. The impact-start torque is 1,100 N·mm or less in the working example. In the example shown in FIG. 23, the impact-start torque according to the working example is approximately 1,000 N·mm or less.

If the impact-start torque is relatively small, the occurrence of the cam-out phenomenon, in which the tool accessory (driver bit) adversely slips out of the cruciform groove of the head portion of the screw during the screw-tightening work, is less likely to occur. According to the findings of the present inventor, the timing of the start of impact on the anvil 10 is earlier in case the impact-start torque is smaller. That is, when the impact-start torque is smaller, the amount of screw rotation from the start of screw tightening to the impact-start time becomes smaller. The occurrence of the cam-out phenomenon is curtailed in case the screw-rotation amount from the screw-tightening start time until the impact-start time is smaller.

Figure 24:
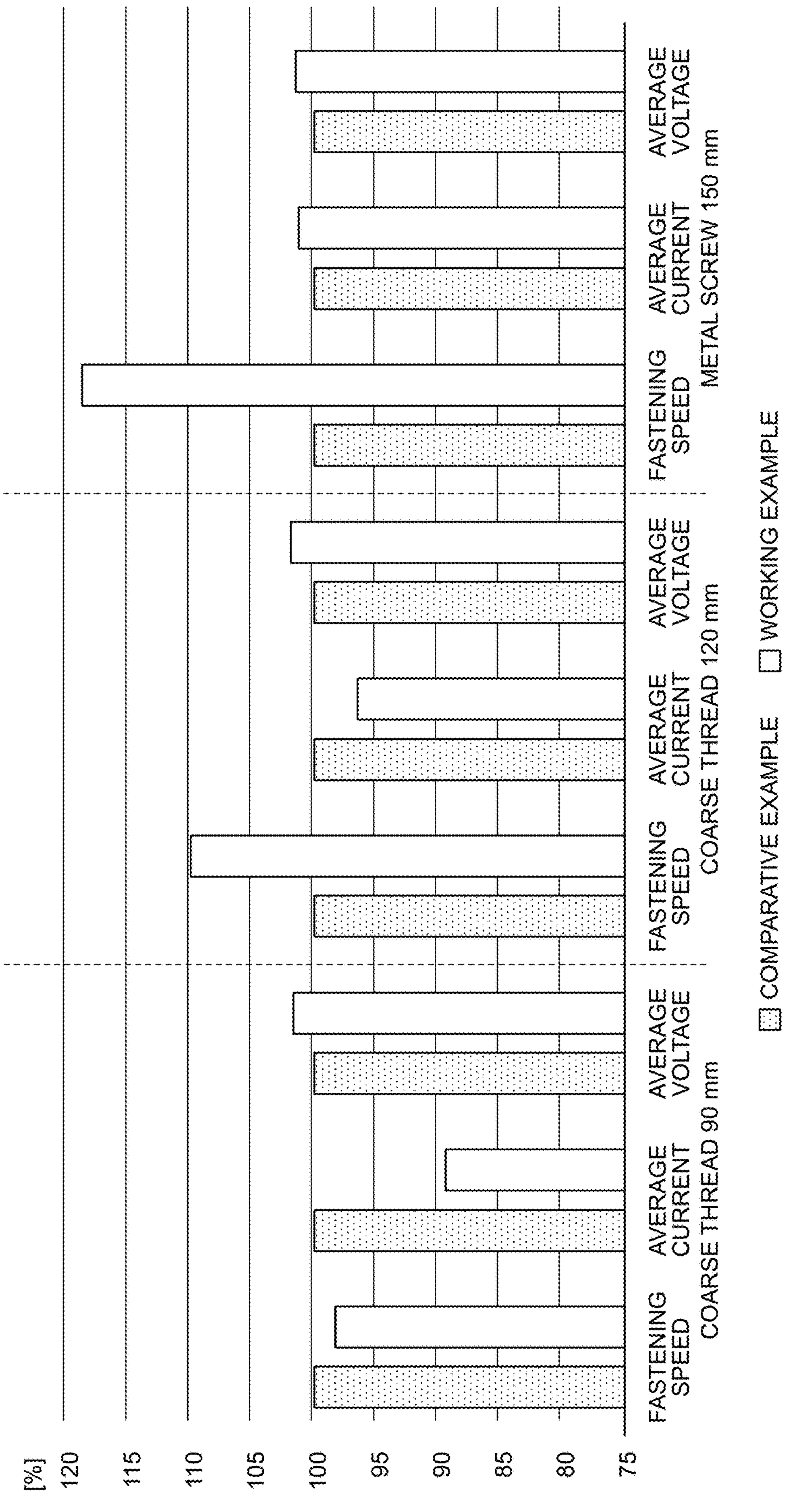
FIG. 24 is a graph that shows the fastening speed, the average current, and the average voltage according to the working example and the comparative example, respectively.

FIG. 24 is a graph that shows the fastening speed, the average current, and the average voltage according to the working example and the comparative example, respectively. Fastening speed means the work speed of screw-tightening work for one screw. The larger the numerical value, the higher the fastening speed, which means that a shorter time is needed from start to finish for the screw-tightening work for one screw. Average current is the average value of the current consumed by the motor 6 during the screw-tightening work for one screw. Average voltage is the average value of the voltage entering the motor 6 during the screw-tightening work for one screw. This means that the smaller the average current and the smaller the average voltage, the less the power consumed by the motor 6.

Using an impact tool according to the working example and an impact tool according to the comparative example, fastening work for a coarse thread of length 90 mm, a coarse thread of length 120 mm, and a metal screw of length 150 mm was performed.

As shown in FIG. 24, the fastening speed according to the working example was higher than the fastening speed according to the comparative example. This is because, in the working example as described with reference to FIG. 21, the hammer 47 rotates at a higher rotational speed, and therefore the anvil 10 can be impacted with a larger impact force. The screw-tightening work can be completed in a shorter time because the anvil 10 is impacted with a larger impact force.

Figure 25:
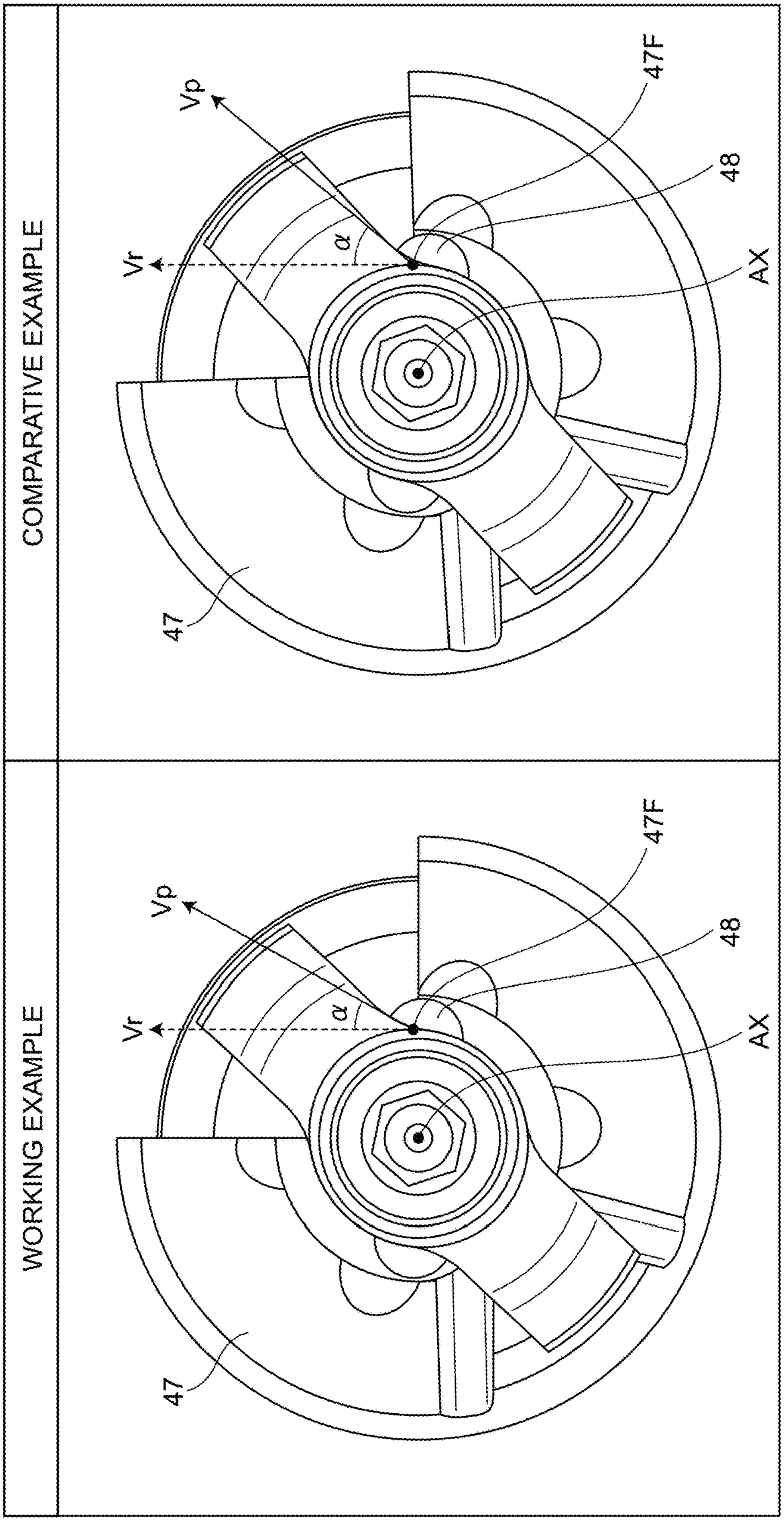
FIG. 25 shows the direction in which a load is transmitted from the ball to the hammer according to the working example and the comparative example, respectively.

FIG. 25 shows the direction in which a load is transmitted from the ball 48 to the hammer 47 according to the working example and the comparative example, respectively. FIG. 25 shows the state at the maximum-stroke time, i.e., a point in time at which the hammer 47 has moved most rearward relative to the spindles 8, 800. Tangent vector Vr is defined as passing through a contact point 47F between the ball 48 and an inner surface of the hammer groove 47B in a direction parallel to a tangent of a circle about rotational axis AX of the spindle 8. Load vector Vp is defined as the direction that a load is transmitted from the ball 48 to the contact point 47F with the hammer 47. According to the present teachings, angle α formed between tangent vector Vr and load vector Vp at the maximum-stroke time is preferably 50° or less. In the working example shown in FIG. 25, angle α formed between tangent vector Vr and load vector Vp at the maximum-stroke time is 45.1°. On the other hand, angle α formed between tangent vector Vr and load vector Vp at the maximum-stroke time in the comparative example is 56.3°.

It is noted that angle α formed between tangent vector Vr and load vector Vp at the impact-start time in the working example is 43.1°. Angle α formed between tangent vector Vr and load vector Vp at the impact-start time in the comparative example is 57.3°.

It is noted that angle α formed between tangent vector Vr and load vector Vp at the impact time in the working example is 58.6°. Angle α formed between tangent vector Vr and load vector Vp at the impact time in the comparative example is 85.7°.

As described above, each of the end portions 82 of each of the spindle grooves 8D is disposed more rearward than the center portion 81 of the corresponding spindle groove 8D. When the hammer 47 moves rearward relative to the spindle 8, each of the balls 48 moves to one of the end portions 82 of the corresponding spindle groove 8D. In the embodiment, angle α formed between tangent vector Vr and load vector Vp changes based on the location of the balls 48 in the spindle grooves 8D (the hammer grooves 47B). In the embodiment, as the balls 48 move closer to the end portions of the spindle grooves 8D, angle α formed between tangent vector Vr and load vector Vp becomes smaller.

This means that the smaller angle α formed between tangent vector Vr and load vector Vp becomes, the more that the force from the spindle 8 acting on the balls 48 acts exclusively in the rotational direction. In the embodiment, among the forces from the spindle 8 acting on the balls 48, because the component in the axial direction is relatively small and the component in the rotational direction is relatively large, the hammer 47 can move forward while rotating at a higher rotational speed.

As explained above, in the embodiment, the impact tool 1 comprises: the motor 6; the spindle 8 disposed more forward than the motor 6 and rotated by the motor 6; the spindle grooves 8D formed in the spindle 8; the balls 48 held in the spindle grooves 8D; the hammer 47 supported by the spindle 8 via the balls 48; the first coil spring 49 and the second coil spring 50, which bias the hammer 47 forward; and the anvil 10, which is impacted by the hammer 47 in the rotational direction. The depth of each of the spindle grooves 8D differs in accordance with its location in the axial direction of the spindle 8.

As described above, when the stop-load torque from the screw acts on the anvil 10 during the screw-tightening work, the rotation of the anvil 10 and the hammer 47 momentarily stops. However, the spindle 8 will continue to rotate owing to the driving of the motor 6. Therefore, as the spindle 8 continues to rotate in the state in which the rotation of the hammer 47 is momentarily stopped, the hammer 47 moves rearward relative to the spindle 8. After the hammer 47 has moved rearward, the hammer 47 is moved forward while rotating owing to the biasing forces of the first coil spring 49 and the second coil spring 50. The anvil 10 is impacted by the hammer 47 in the rotational direction owing to the hammer 47 moving forward while rotating.

In the above-mentioned configuration, the depth of each of the spindle grooves 8D differs in accordance with its location in the axial direction of the spindle 8; therefore, among the forces acting between the spindle 8 and the balls 48, the component in the rotational direction becomes larger. Consequently, the rotational speed of the hammer 47—when the hammer 47 is moving forward while rotating—can be increased. Because the rotational speed of the hammer 47 can be increased, the hammer 47 can impact the anvil 10 with a larger impact force.

Additionally, among the forces acting between the spindle 8 and the balls 48, the component in the rotational direction becomes larger and the component in the axial direction becomes smaller; therefore, even if the first coil spring 49 and the second coil spring 50 were to have small spring coefficients, the first coil spring 49 and the second coil spring 50 can still bias the hammer 47 forward. That is, even if the first coil spring 49 and the second coil spring 50 were to have small biasing forces, the hammer 47 can move forward while rotating owing to the biasing forces of the first coil spring 49 and the second coil spring 50. By using the first coil spring 49 and the second coil spring 50, which have smaller biasing forces, the timing of the start of impact of the hammer 47 on the anvil 10 can be made earlier. That is, the interval from the point in time when the rotation of the hammer 47 has stopped until the point in time when the anvil 10 is impacted by the hammer 47 becomes shorter.

During the screw-tightening work, the anvil 10 is rotated in the state in which the tool accessory mounted on the anvil 10 is inserted in a cruciform groove formed in the head portion of the screw. If the timing of the start of impact of the hammer 47 on the anvil 10 is later, that is, if the amount of screw rotation from the screw-tightening start time until the impact time when the anvil 10 is impacted by the hammer 47 is larger, then the probability of the occurrence of the cam-out phenomenon, in which the tool accessory adversely comes completely out of the cruciform groove, becomes high. On the other hand, in the above-mentioned configuration, because the timing of the start of impact of the hammer 47 on the anvil 10 is earlier, the cam-out phenomenon is less likely to occur.

In the embodiment, the end portions 82 of each of the spindle grooves 8D are disposed more rearward than the center portion 81 of that spindle groove 8D. When the hammer 47 moves rearward relative to the spindle 8, each of the balls 48 moves to one of the end portions 82 of the corresponding spindle groove 8D. The center 48C of each of the balls 48 is disposed inside the corresponding spindle groove 8D at one of the end portions 82 of the corresponding spindle groove 8D; i.e. the center 48C is below the outer circumferential surface 8S.

As the hammer 47 moves rearward relative to the spindle 8, each of the balls 48 moves from the center portion 81 to one of the end portions 82 of the corresponding spindle groove 8D. As the hammer 47 moves forward relative to the spindle 8 owing to the biasing forces of the first coil spring 49 and the second coil spring 50, each of the balls 48 moves from one of the end portions 82 to the center portion 81 of the corresponding spindle groove 8D. In the above-mentioned configuration, because the center 48C of each of the balls 48 sinks into the inside of the corresponding spindle groove 8D at one of the end portions 82 of the corresponding spindle groove 8D, the rotational speed of the hammer 47 when the hammer 47 moves forward while rotating can be increased. Because the rotational speed of the hammer 47 can be increased, the hammer 47 can impact the anvil 10 with a larger impact force.

In the embodiment, the center 48C of each of the balls 48 is disposed outside the corresponding spindle groove 8D at the center portion 81 of the corresponding spindle groove 8D.

When the hammer 47 impacts the anvil 10, the balls 48 move from the end portions 82 to the center portions 81 of the spindle grooves 8D. In the above-mentioned configuration, because the center 48C of each of the balls 48 that is at the center portion 81 of the corresponding spindle groove 8D is disposed outside the corresponding spindle groove 8D (i.e. the center 48C is radially outward of the outer circumferential surface 8S), the rotational speed of the hammer 47—at the moment the hammer 47 impacts the anvil 10—can be increased. Because the rotational speed of the hammer 47 can be increased, the hammer 47 can impact the anvil 10 with a larger impact force.

In the embodiment, the spindle 8 comprises the flange portion, which supports the rear-end portions of the first coil spring 49 and the second coil spring 50, and the spindle-shaft portion 8B, which protrudes forward from the flange portion. The spindle grooves 8D are formed in the spindle-shaft portion 8B. The trajectory of the center 48C of each of the balls 48 enters within the width of the spindle-shaft portion 8B.

In the above-mentioned configuration, because the balls 48 have a smaller range of motion, the rotational speed of the hammer 47 can be increased without enlarging the impact tool 1.

In the embodiment, the trajectory of the balls 48 has an arcuate shape.

In the above-mentioned configuration, the balls 48 move with circular motion along a virtual circle having a small radius. Consequently, the hammer 47 can move in the axial direction while rotating smoothly. Because the sliding resistance of the hammer 47 becomes smaller, the rotational speed of the hammer 47 can be increased. Consequently, the hammer 47 can impact the anvil 10 with a larger impact force.

In the embodiment, the balls 48 may move with circular motion within a virtual plane that is tilted by a prescribed angle from the rotational axis of the spindle 8.

In the above-mentioned configuration, because the sliding resistance of the hammer 47 becomes smaller, the rotational speed of the hammer 47 can be increased. Consequently, the hammer 47 can impact the anvil 10 with a larger impact force.

In the embodiment, the balls 48 move with circular motion so that the center 48C of each of the balls 48 moves along a virtual circle defined in the virtual plane. The center 90C of the virtual circle is defined at a location that is offset from rotational axis AX of the spindle 8.

In the above-mentioned configuration, the hammer 47 can impact the anvil 10 with a larger impact force.

In the embodiment, the spindle 8 comprises the flange portion, which supports the rear-end portions of the first coil spring 49 and the second coil spring 50, and the spindle-shaft portion 8B, which protrudes forward from the flange portion. The spindle grooves 8D are formed in the spindle-shaft portion 8B. The diameter of the virtual circle is smaller than the diameter of the spindle-shaft portion 8B.

In the above-mentioned configuration, because the balls 48 have a smaller range of motion, the rotational speed of the hammer 47 can be increased without enlarging the impact tool 1.

In the embodiment, the impact-start torque, which indicates the torque acting on the anvil 10 when the hammer 47 starts impacting the anvil 10, is 1,100 N·mm or less.

In the above-mentioned configuration, because the impact-start torque is smaller, the timing of the start of impact of the hammer 47 on the anvil 10 will be earlier. That is, the amount of screw rotation from the screw-tightening start time until the impact time when the anvil 10 is impacted by the hammer 47 becomes smaller.

If the timing of the start of impact of the hammer 47 on the anvil 10 were to be later, that is, if the amount of screw rotation from the screw-tightening start time until the impact time when the anvil 10 is impacted by the hammer 47 is larger, then the probability of the occurrence of the cam-out phenomenon, in which the tool accessory adversely comes completely out of the cruciform groove, becomes higher. On the other hand, in the above-mentioned configuration, the timing of the start of impact of the hammer 47 on the anvil 10 is earlier, and therefore the cam-out phenomenon is less likely to occur.

In the embodiment, the impact tool 1 is provided with the battery-mounting part 13 to which the battery pack 25 is mounted. The rated voltage of the battery pack 25 is 18 V or more.

In the above-mentioned configuration, the rated voltage of the battery pack 25 is 18 V or more, and therefore a high torque output can be achieved for the impact tool 1.

In the embodiment, the depth of each of the spindle grooves 8D differs in accordance with its location in the axial direction of the spindle 8. That is, the depth at the end portions 82 of the spindle grooves 8B is greater than at the center portion 81, preferably at least 5% deeper.

Consequently, the occurrence of the cam-out phenomenon is curtailed.

In other words, the depth at the rear portion of each of the spindle grooves 8D is deeper than the depth at the front portion of the corresponding spindle groove 8D. The depth at each of the end portions 82 of each of the spindle grooves 8D is deeper than the depth at the center portion 81 of the corresponding spindle groove 8D.

In the above-mentioned configuration, the center 48C of each of the balls 48 can sink into the inside of the corresponding spindle groove 8D at the end portions 82, and therefore, among the forces acting between the spindle 8 and the balls 48, the component in the rotational direction becomes larger. Consequently, the rotational speed of the hammer 47—when the hammer 47 is moving forward while rotating—can be increased. Because the rotational speed of the hammer 47 can be increased, the hammer 47 can impact the anvil 10 with a larger impact force.

Other Embodiments

In the embodiment described above, the widths of the end portions 82 of each of the spindle grooves 8D may be wider than the width of the center portion 81 of the corresponding spindle groove 8D. In the situation in which the widths of the end portions 82 are wider than the width of the center portion 81, among the forces acting between the spindle 8 and the balls 48, the component in the rotational direction becomes larger at the maximum-stroke time.

In the embodiment described above, the impact tool 1 is assumed to be an impact driver. The impact tool 1 may be an impact wrench. In the embodiment described above, the impact tool 1 may be an angle impact tool.

In the embodiment described above, the power supply of the impact tool 1 is not required to be the battery pack 25 and may be a commercial power supply (AC power supply). The commercial power supply supplies a voltage of 18 V or more to the motor 6.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved spindles for, e.g., impact tools and similar power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact tool
2 Housing
2L Left housing
2R Right housing
2S Screw
3 Rear cover
3S Screw
4 Hammer case
4A Support surface
4B Groove
5 Hammer-case cover
6 Motor
7 Speed-reducing mechanism
8 Spindle
8A Flange portion
8B Spindle-shaft portion
8C Protruding portion
8D Spindle groove
8E Spindle recessed portion
8S Outer circumferential surface
9 Impact mechanism
10 Anvil
10A Tool hole
10B Anvil-protruding portion
11 Tool-holding mechanism
12 Fan
12A Bushing
13 Battery-mounting part
14 Trigger lever
15 Forward/reverse-change lever
16 Operation-and-display part
16A Manipulatable button
17 Mode-change switch
18 Light assembly
18A Base member
18B Light-emitting device
18C Ring member
19 Air-intake port
20 Air-exhaust port
21 Motor-housing part
22 Grip part
23 Battery-holding part
24 Bearing box
24A Recessed portion
24B Protruding portion
25 Battery pack
26 Stator
27 Rotor
28 Stator core
29 Front insulator
29S Screw
30 Rear insulator
31 Coil
32 Rotor-core portion
33 Rotor-shaft portion
33F Front-side shaft portion
33R Rear-side shaft portion
34 Rotor magnet
35 Sensor magnet
37 Sensor board
38 Fusing terminal
39 Rotor bearing
39F Front-side rotor bearing
39R Rear-side rotor bearing
41 Pinion gear
42 Planet gear
42P Pin
43 Internal gear
44 Spindle bearing
45 O-ring
45A O-ring
45B O-ring
46 Bearing
46A Bearing
46B Bearing
47 Hammer
47A Hole
47B Hammer groove
47C Recessed portion
47D Hammer body
47E Hammer-projection portion
47F Contact point
48 Ball
48C Center

49 First coil spring
50 Second coil spring
51 Third coil spring
52 First washer
53 Second washer
54 Ball
61 Ring member
62 Restraining member
71 Ball
72 Leaf spring
73 Sleeve
74 Coil spring
75 Positioning member
76 Support recessed portion
81 Center portion
82 End portion
90 Virtual circle
90C Center
91 Virtual plane
92 Cutting tool
92C Center
101 Anvil-shaft portion
102 Anvil-projection portion
401 First tube portion
402 Second tube portion
800 Spindle
800B Spindle-shaft portion
800D Spindle groove
820 End portion
AX Rotational axis
Da Diameter
Vc Arrow
Ve Arrow

The invention claimed is:

1. An impact tool comprising:
a motor;
a spindle extending in an axial direction and configured to be rotated by the motor;
a spindle groove formed in the spindle;
a ball held in the spindle groove;
a hammer supported on the spindle via the ball;
a spring, which biases the hammer forward; and
an anvil configured to be impacted by the hammer in a rotational direction;
wherein the depth of a rear portion of the spindle groove in the axial direction is deeper than the depth of a front portion of the spindle groove in the axial direction.

2. The impact tool according to claim 1, wherein the depth of the rear portion of the spindle groove is at least 5% deeper than the depth of the front portion of the spindle groove.

3. The impact tool according to claim 1, wherein the depth of the rear portion of the spindle groove is 5%-15% deeper than the depth of the front portion of the spindle groove.

4. The impact tool according to claim 1, wherein the depth of the spindle groove is such that:
at the rear portion of the spindle groove, the center of the ball is located radially inward of an outer circumferential surface of a spindle shaft portion of the spindle, and
at the front portion of the spindle groove, the center of the ball is located radially outward of the outer circumferential surface of the spindle shaft portion of the spindle.

5. The impact tool according to claim 4, wherein the depth of the rear portion of the spindle groove is 5%-15% deeper than the depth of the front portion of the spindle groove.

6. The impact tool according to claim 5, wherein the spindle groove has an arcuate shape.

7. A method for manufacturing the impact tool according to claim 1, comprising:
while forming the spindle groove, disposing at least a portion of the trajectory of the geometric center of a cutting tool more radially inward than the outer circumferential surface of the spindle.

8. The method according to claim 7, wherein, at the rear portion of the spindle groove, the geometric center of the cutting tool is disposed more radially inward than the outer circumferential surface of the spindle.

9. The method according to claim 8, wherein, at the front portion of the spindle groove, the geometric center of the cutting tool is disposed more radially outward than the outer circumferential surface of the spindle.

10. An impact tool comprising:
a motor;
a spindle configured to be rotated by the motor;
a spindle groove formed in the spindle;
a ball held in the spindle groove;
a hammer supported on the spindle via the ball;
a spring, which biases the hammer forward; and
an anvil configured to be impacted by the hammer in a rotational direction;
wherein the depth of an end portion of the spindle groove is deeper than the depth of a center portion of the spindle groove.

11. The impact tool according to claim 10, wherein the depth of the end portion of the spindle groove is at least 5% deeper than the depth of the center portion of the spindle groove.

12. The impact tool according to claim 10, wherein the depth of the end portion of the spindle groove is 5%-15% deeper than the depth of the center portion of the spindle groove.

13. The impact tool according to claim 10, wherein the depth of the spindle groove is such that:
at the end portion of the spindle groove, the center of the ball is located radially inward of an outer circumferential surface of a spindle shaft portion of the spindle, and
at the center portion of the spindle groove, the center of the ball is located radially outward of the outer circumferential surface of the spindle shaft portion of the spindle.

14. The impact tool according to claim 13, wherein the depth of the end portion of the spindle groove is at least 5% deeper than the depth of the center portion of the spindle groove.

15. The impact tool according to claim 13, wherein the depth of the end portion of the spindle groove is 5%-15% deeper than the depth of the center portion of the spindle groove.

16. The impact tool according to claim 15, wherein the spindle groove has an arcuate shape.

17. The impact tool according to claim 16, further comprising:
a speed-reducing mechanism that operably couples the motor to the spindle.

18. The impact tool according to claim 17, further comprising:
a tool-holding mechanism provided on the anvil;
wherein the center portion of the spindle groove is closer to the tool-holding mechanism than the end portion of the spindle groove.

19. The impact tool according to claim 10, further comprising:

a speed-reducing mechanism that operably couples the motor to the spindle.

20. The impact tool according to claim 10, further comprising:

a tool-holding mechanism provided on the anvil;

wherein the center portion of the spindle groove is closer to the tool-holding mechanism than the end portion of the spindle groove.

* * * * *